(12) United States Patent
Le Noc et al.

(10) Patent No.: US 8,748,808 B2
(45) Date of Patent: Jun. 10, 2014

(54) DETECTION AND CORRECTION OF A LOSS OF CALIBRATION OF MICROBOLOMETER THERMAL IMAGING RADIOMETERS

(75) Inventors: Loic Le Noc, Quebec (CA); Bruno Tremblay, St-Etienne de Lauzon (CA)

(73) Assignee: Institut National d'Optique, Quebec, Quebec (CA)

( * ) Notice: Subject to any disclaimer, the term of this patent is extended or adjusted under 35 U.S.C. 154(b) by 123 days.

(21) Appl. No.: 13/473,203

(22) Filed: May 16, 2012

(65) Prior Publication Data
US 2013/0306851 A1   Nov. 21, 2013

(51) Int. Cl.
*G01D 18/00* (2006.01)
(52) U.S. Cl.
USPC ........................................ 250/252.1; 250/349
(58) Field of Classification Search
USPC .............................................. 250/252.1, 349
See application file for complete search history.

(56) References Cited

U.S. PATENT DOCUMENTS

| | | | |
|---|---|---|---|
| 5,756,999 A * | 5/1998 | Parrish et al. | 250/332 |
| 6,028,309 A * | 2/2000 | Parrish et al. | 250/332 |
| 6,683,310 B2 * | 1/2004 | Wood | 250/338.1 |
| 7,385,199 B2 | 6/2008 | DeWames et al. | |
| 7,679,048 B1 * | 3/2010 | Aziz et al. | 250/252.1 |
| 8,171,801 B2 | 5/2012 | Le Noc et al. | |
| 2007/0029484 A1 * | 2/2007 | Anderson et al. | 250/338.1 |
| 2010/0065729 A1 * | 3/2010 | Legras et al. | 250/252.1 |
| 2010/0154510 A1 * | 6/2010 | Viens et al. | 73/25.03 |
| 2010/0154554 A1 | 6/2010 | Le Noc et al. | |
| 2012/0211648 A1 * | 8/2012 | Linsacum et al. | 250/252.1 |

* cited by examiner

*Primary Examiner* — David Porta
*Assistant Examiner* — Taeho Jo
(74) *Attorney, Agent, or Firm* — Merchant & Gould P.C.

(57) ABSTRACT

A method detects a loss of calibration of a thermal imaging radiometer including an array of imaging microbolometers and a gauge microbolometer. The detection method includes applying a first and a second electrical stimulation to the gauge microbolometer to bring it to a first and a second predetermined temperature, followed by measuring an ohmic responsivity of the gauge microbolometer that is representative of a difference between the first and second electrical stimulations. The measured ohmic responsivity is compared with a reference ohmic responsivity, such that a loss of calibration is signaled whenever the measured and reference ohmic responsivities differ by more than a predetermined threshold. A correction method includes steps of the detection method, to yield a corrected voltage response function for each imaging microbolometer. Advantageously, the methods involve probing the electrical response of the gauge microbolometer without requiring thermoregulated blackbody calibrations sources.

37 Claims, 9 Drawing Sheets

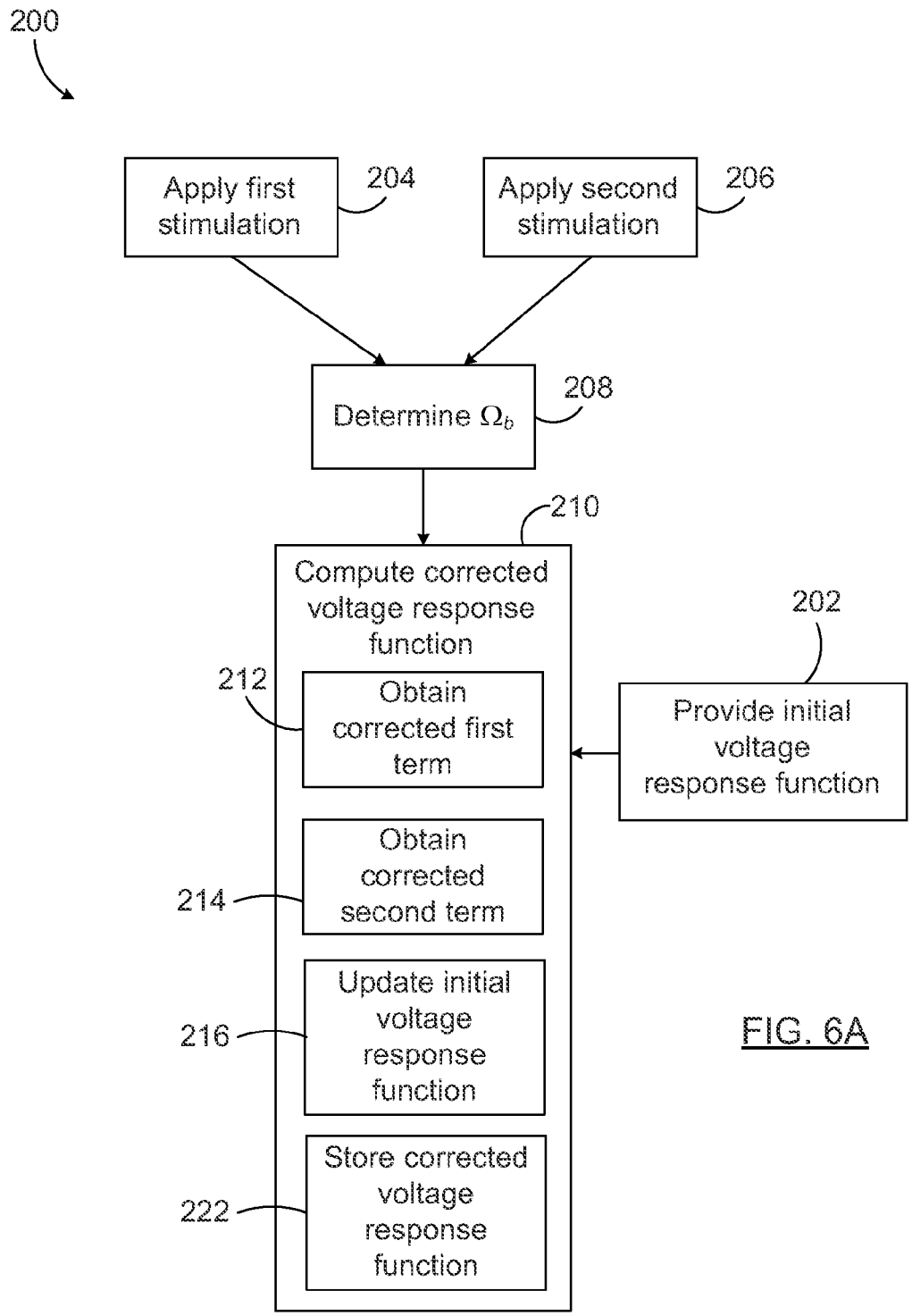

DETECTION AND CORRECTION OF A LOSS OF CALIBRATION OF MICROBOLOMETER THERMAL IMAGING RADIOMETERS

FIELD OF THE INVENTION

The present invention relates to the field of microbolometer thermal imaging radiometers, and more particularly concerns methods and systems for detecting and correcting a loss of calibration thereof.

BACKGROUND OF THE INVENTION

A radiometer is a detector capable of sensing and measuring the radiant power or intensity of electromagnetic radiation incident thereon. In the infrared portion of the electromagnetic spectrum, radiometers usually act as thermal cameras. In this case, a thermal imaging radiometer is adapted to record incoming infrared radiation emitted by the objects of a target scene encompassed by the field of view of the instrument. The recorded radiation is converted into electrical signals, which are processed in order to provide a thermal infrared image displaying the spatial temperature distribution of the scene under observation. Thermal infrared imaging radiometers typically include optics that collect radiation emitted from a target scene and focus that radiation onto a linear or two-dimensional focal plane array (FPA) of elemental temperature-sensing detectors, such as uncooled infrared microbolometers.

Microbolometers are thermal detectors capable of operating at room temperature. They are relatively inexpensive to produce and since they do not require cryogenic cooling, they can be integrated within compact and robust devices that are less expensive than cooled detectors. They can be used in a wide variety of applications, including night vision, observation of the Earth from space, pollution and fire detection, spectroscopy, and border control.

Referring to FIGS. 1A and 1B (PRIOR ART), there are shown schematic top and side cross-sectional views, respectively, of a typical thermal imaging radiometer 20. The thermal imaging radiometer 20 includes an array of imaging microbolometers 22 disposed on a substrate 34 and enclosed inside a vacuum package 36. The vacuum package 36 includes a window 50 allowing incoming radiation 54 to reach the imaging microbolometers 22.

Each imaging microbolometer 22 of the array typically includes a sensor element 40 and supporting legs 42 that thermally isolate the sensing element 40 from the substrate 34, typically by suspending it thereabove. As is known in the art, the electrical resistance of the sensor element 40 changes in response to a variation of temperature thereof, which in turn varies as a function of the amount of radiation 54 absorbed thereby. In other words, radiation 54 impinging on the sensor element 40 of each imaging microbolometer 22 of the array increases the temperature of the sensor element 40 and causes a corresponding variation of its electrical resistance.

The substrate 34 on which lies the array of imaging microbolometers 22 may further include an imaging electrical readout circuit 30 adapted to convert the resistance change of each imaging microbolometer 22 into a corresponding electrical output (e.g., a voltage or a current output). This electrical output may be subsequently processed (e.g., amplified, multiplexed, filtered, digitized, and the like) into temperature data by a processing unit 38 connected to the imaging readout electrical circuit 30. The temperature data can then be used to generate a pixelated thermal image of a target scene, wherein each pixel of the thermal image is associated with a corresponding imaging microbolometer 22 of the array. This thermal image may be displayed on a screen or stored for later use or processing.

Generally, in order to yield reliable temperature measurements, each imaging microbolometer must be properly calibrated. This may be accomplished, for example, by exposing the imaging microbolometer array to radiation from a blackbody calibration source, and by sensing the electrical output of each imaging microbolometer of the array in response thereto. The procedure may be repeated with a set of blackbody calibration sources maintained at various temperatures in order to cover a desired temperature range. This initial calibration is most often performed in a factory setting during the manufacturing process of the radiometers or prior to a first use thereof, so as to provide the proper conditions required for accurate calibration. Once calibrated, each microbolometer of the array is provided with an individual response function that relates the electrical output response of the microbolometer associated therewith to the temperature of the specific part of the scene imaged thereon. This response function is stored and retrieved during operation of the radiometer in order to convert the electrical output generated by each imaging microbolometer into temperature data that may be used to form a thermal image of a target.

However, once a microbolometer is calibrated, the manufacturer cannot guarantee, and often underestimates, the time during which the calibration will remain valid. For this reason, radiometers need to go through frequent periodic recalibration runs so as to ensure optimal performance and to correct calibration drifts which, over time, inevitably start degrading the accuracy and sensitivity of measurements. Calibration drifts in the response of radiometers can be neither detected nor easily corrected in the field since they require exposition to blackbody calibration sources under controlled environmental conditions. Therefore, these frequent periodic recalibration runs often need to be performed at the premises of the manufacturer, thus increasing maintenance costs while making the radiometers unavailable for their intended use, sometimes for extended periods of time. Moreover, spare radiometer units may be made available to allow for uninterrupted field operations, which may amount to a substantial fraction of the inventory of radiometers used simultaneously in the field, thus further increasing the costs associated with the recalibration runs. The overall costs of recalibrating radiometers may thus be as high as those incurred during the initial calibration thereof.

In view of the above considerations, there exists a need in the art for a method for detecting a loss of calibration of microbolometer thermal imaging radiometers that could be performed in the field without having to use an external calibration setup. There also exists a need in the art for a method capable of correcting a loss of calibration of such radiometers without having to go through a full recalibration procedure involving blackbody calibration sources in a controlled factory setting.

SUMMARY OF THE INVENTION

According to a first aspect of the invention, there is provided a method for detecting a loss of calibration of a thermal imaging radiometer including an array of imaging microbolometers and a gauge microbolometer for detecting the loss of calibration. The method includes the steps of:

a) applying a first electrical stimulation to the gauge microbolometer which brings the gauge microbolometer to a first predetermined temperature in a steady-state thermal regime;

b) applying a second electrical stimulation to the gauge microbolometer which brings the gauge microbolometer to a second predetermined temperature in a steady-state thermal regime, steps a) and b) being performed under substantially identical radiation exposure conditions;

c) determining a measured ohmic responsivity of the gauge microbolometer, the measured ohmic responsivity being representative of a difference between the first and second electrical stimulations; and d) comparing the measured ohmic responsivity with a reference ohmic responsivity of the gauge microbolometer, and signaling a loss of calibration of the thermal imaging radiometer when the measured ohmic responsivity and the reference ohmic responsivity differ by more than a predetermined threshold.

According to another aspect of the invention, there is provided a thermal imaging radiometer including:

an array of imaging microbolometers;

a gauge microbolometer for detecting a loss of calibration of the thermal imaging radiometer;

an electrical power source connected to the gauge microbolometer and configured to apply, under substantially identical radiation exposure conditions, a first electrical stimulation to the gauge microbolometer which brings the gauge microbolometer to a first predetermined temperature in a steady-state thermal regime, and a second electrical stimulation to the gauge microbolometer which brings the gauge microbolometer to a second predetermined temperature in a steady-state thermal regime;

a gauge electrical readout circuit connected to the gauge microbolometer and configured to determine a measured ohmic responsivity thereof, the measured ohmic responsivity being representative of a difference between the first and second electrical stimulations;

a processing unit connected to the gauge electrical readout circuit and configured to compare the measured ohmic responsivity with a reference ohmic responsivity of the gauge microbolometer, and to signal a loss of calibration of the thermal imaging radiometer when the measured ohmic responsivity and the reference ohmic responsivity differ by more than a predetermined threshold.

According to a further aspect of the invention, there is provided a method for correcting a loss of calibration of a thermal imaging radiometer including an array of imaging microbolometers and a gauge microbolometer for detecting the loss of calibration, the method including the steps of:

a) providing, for each imaging microbolometer, an initial voltage response function providing an output voltage of the associated imaging microbolometer as a function of a scene temperature, the initial voltage response function comprising a first and a second term, wherein the first term is equal to the output voltage corresponding to an initial reference scene temperature, and wherein the second term is a function of a difference between the scene temperature and the initial reference scene temperature;

b) applying a first electrical stimulation to the gauge microbolometer which brings the gauge microbolometer to a first predetermined temperature in a steady-state thermal regime;

c) applying a second electrical stimulation to the gauge microbolometer which brings the gauge microbolometer to a second predetermined temperature in a steady-state thermal regime, steps b) and c) being performed under substantially identical radiation exposure conditions;

d) determining a measured ohmic responsivity of the gauge microbolometer, the measured ohmic responsivity being representative of a difference between the first and second electrical stimulations; and e) computing a corrected voltage response function for each imaging microbolometer, the computing including:

i) obtaining a corrected value for the first term of the corresponding initial voltage response function by measuring the output voltage of the imaging microbolometer in response to irradiation by a blackbody at an updated reference scene temperature;

ii) obtaining a corrected value for the second term of the corresponding initial voltage response function by re-expressing the second term as a function of a difference between the scene temperature and the updated reference scene temperature and by multiplying the second term by a correction factor, the correction factor being defined as a ratio between a reference ohmic responsivity of the gauge microbolometer and the measured ohmic responsivity; and iii) updating both the first and the second terms of the initial voltage response function with both corrected values for the first and second terms to obtain a corrected voltage response function for each imaging microbolometer.

Embodiments of the present invention provide methods and systems that allow detecting a loss of calibration of microbolometer thermal imaging radiometers directly in the field, therefore limiting recourse to recalibration procedures involving thermoregulated blackbody calibration sources to circumstances that really require them. Some embodiments of the invention further provide a method for correcting a loss of calibration of such imaging radiometers, thereby extending the usefulness of the device before recalibration thereof is required. This correction method may involve determining the response of the array of imaging microbolometers to a blackbody at a known temperature, which may be simulated by closing a shutter of the thermal imaging radiometer. The shutter then plays the role of the blackbody (i.e. a high emissivity surface) and its temperature may be monitored by equipping the shutter with a temperature measuring device.

Advantageously, the methods according to embodiments of the invention can thus be performed without requiring a full calibration setup involving several calibrated blackbodies and rigorously controlled environmental conditions. By way of example, embodiments of the invention may be particularly advantageous for thermal radiometers used in space missions wherein lightweight devices are a premium.

In some embodiments of the invention, the thermal imaging radiometer includes a plurality of gauge microbolometers. For these embodiments, the methods for detecting and correcting a loss of calibration of the thermal imaging radiometer yield a plurality of values of measured ohmic responsivity, from which an average measured ohmic responsivity is obtained. Providing a plurality of gauge microbolometers may thus increase the accuracy of the detection and correction methods since non-uniformities and degradation in the response of any gauge microbolometer will tend to get compensated for.

Other features and advantages of the present invention will be better understood upon reading of preferred embodiments thereof with reference to the appended drawings.

BRIEF DESCRIPTION OF THE DRAWINGS

FIGS. 6A and 6B are flow charts of a method for correcting a loss of calibration of a thermal imaging radiometer according to embodiments of the invention, wherein the thermal imaging radiometer includes one gauge microbolometer (FIG. 6A) and a plurality of gauge microbolometers (FIG. 6B).

DESCRIPTION OF PREFERRED
EMBODIMENTS OF THE INVENTION

The present invention generally relates to methods for detecting and correcting a loss of calibration of microbolometer thermal imaging radiometers, as well as to microbolometer thermal imaging radiometers capable of performing these methods.

Advantageously, the methods described herein can be carried out directly in the field and thus provide a convenient way of verifying if a thermal imaging radiometer is still properly calibrated prior to performing measurements, and optionally of correcting a detected loss of calibration. In particular, these methods can be performed without using series of precisely calibrated blackbody sources, which are often cumbersome, expensive, and not easily transportable.

To accomplish this, thermal imaging radiometers according to embodiments of the present invention include, besides an array of imaging microbolometers, at least one additional gauge microbolometer adapted to detect calibration drifts in the thermal response thereof. Advantageously, as will be described in further detail hereinbelow, the methods of detecting and correcting a loss of calibration of the thermal response of the radiometer involve probing the electrical response of the gauge microbolometer when it is brought from a first predetermined temperature to a second predetermined temperature. A variation over time of this electrical response will then be interpreted as a loss of calibration of the thermal response of the imaging microbolometers of the radiometer.

Method for Detecting a Loss of Calibration of a Thermal Imaging Radiometer

Figure 5A:
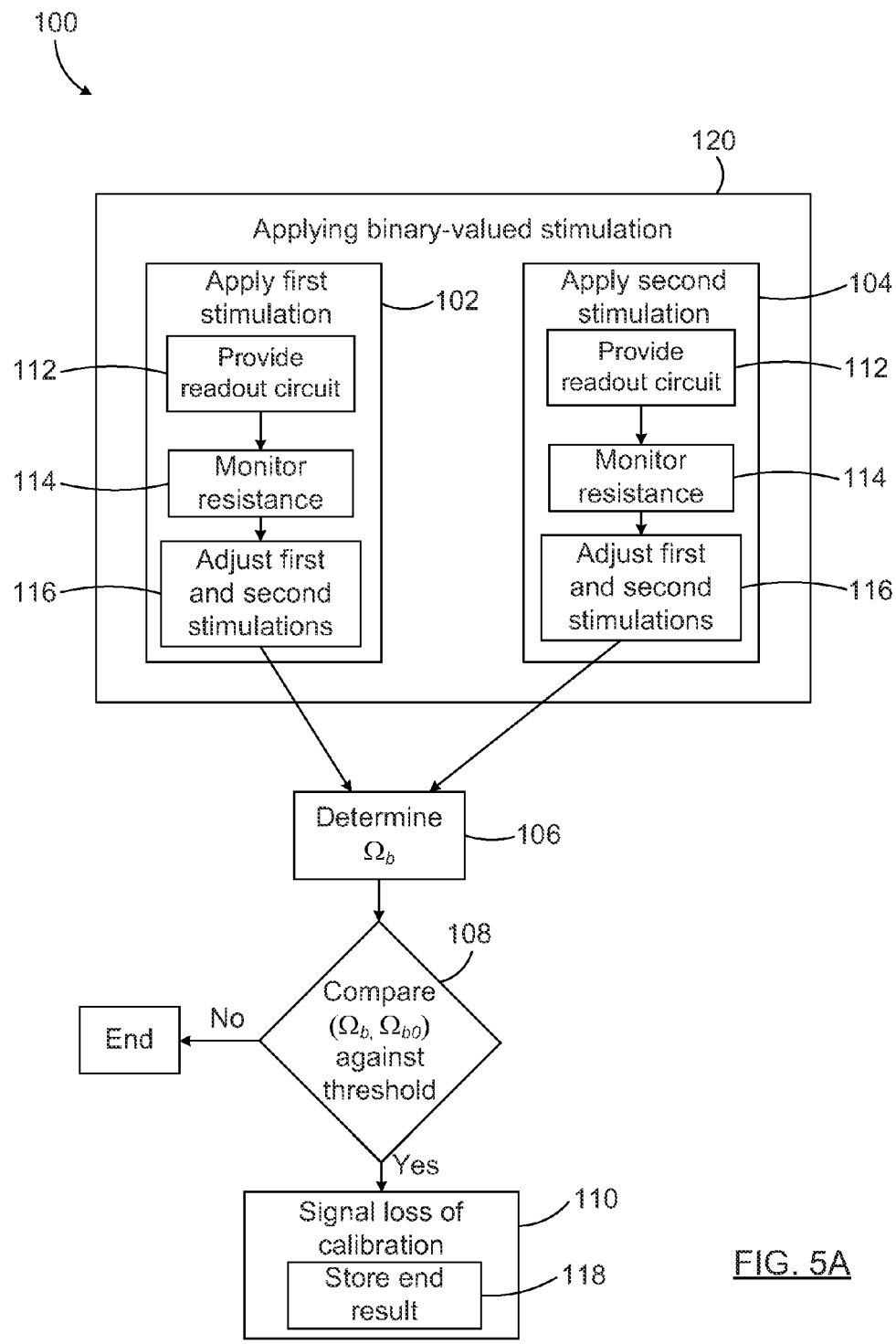
FIGS. 5A and 5B are flow charts of a method for detecting a loss of calibration of a thermal imaging radiometer according to embodiments of the invention, wherein the thermal imaging radiometer includes one gauge microbolometer (FIG. 5A) and a plurality of gauge microbolometers (FIG. 5B).

According to an aspect of the invention, there is provided a method 100 for detecting a loss of calibration of a thermal imaging radiometer including an array of imaging microbolometers and a gauge microbolometer for detecting the loss of calibration. FIG. 5A shows a flow chart of an embodiment of the method 100, which can, by way of example, be performed with a thermal imaging radiometer 20 such as that illustrated in FIGS. 2A and 2B.

In the present description, the expression "thermal imaging radiometer" is understood to refer to a detector capable of sensing incoming thermal radiation emitted from a target scene and of providing therefrom a thermal image of the target scene. Likewise, the expression "thermal image" is understood herein to refer to any image data providing spatially-resolved temperature information.

As known in the art, a microbolometer thermal imaging radiometer is a pixelated thermal detector that includes an array of imaging microbolometers. The temperature of each imaging microbolometer of the array increases upon absorption of thermal radiation power $P_{scene}$ from a target scene. This temperature increase is detected by measuring a change of resistance of each imaging microbolometer so that the resulting temperature data may then be used to generate a pixelated thermal image, which provides information about the spatial distribution of thermal radiation in the target scene. More particularly, each pixel of the thermal image is associated with a corresponding imaging microbolometer 22 of the array, wherein the brightness of each pixel is representative of the temperature of a corresponding region of the scene. It should be noted that although microbolometer thermal imaging radiometers are generally used to sense infrared radiation, embodiments of the present invention may also be used in other regions of the electromagnetic spectrum.

Figure 1:
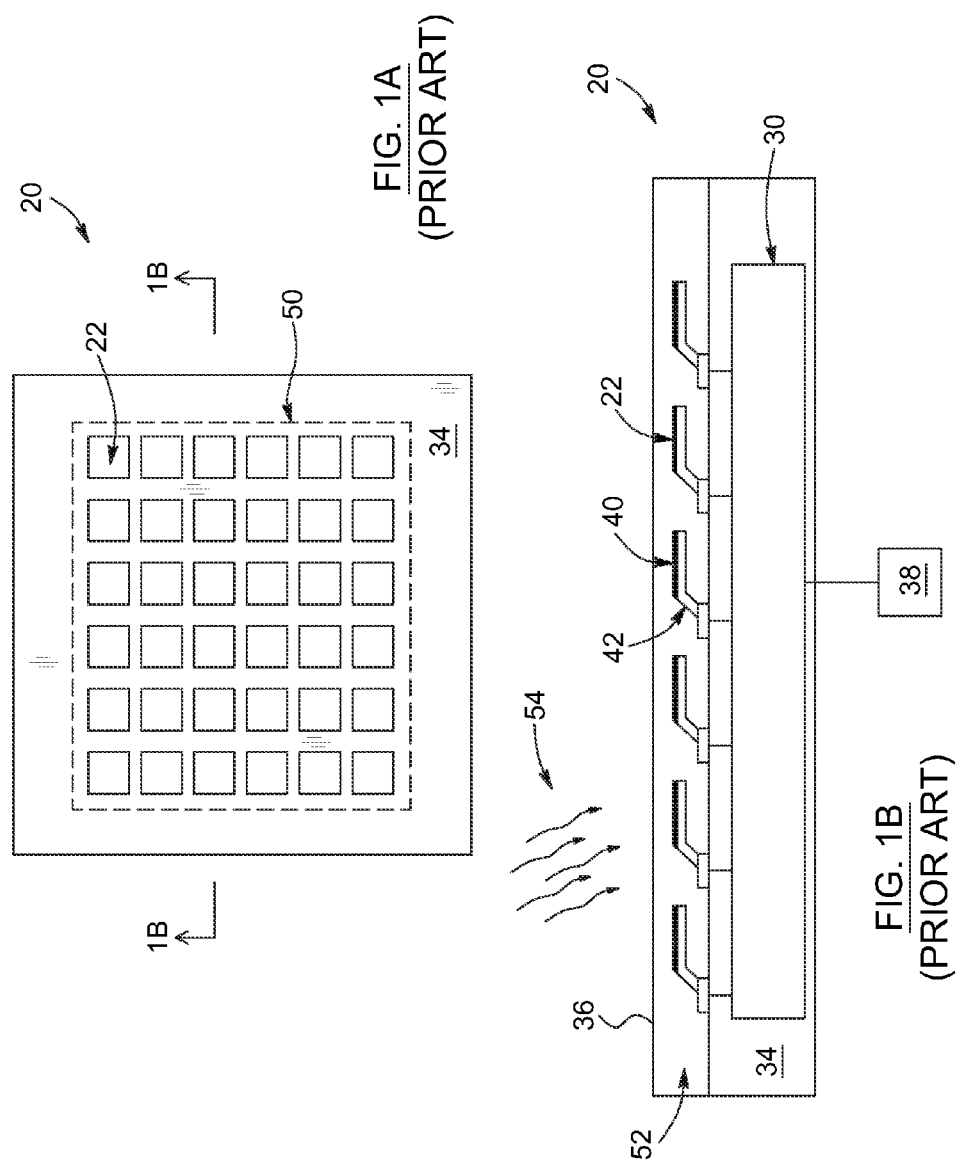
FIGS. 1A and 1B (PRIOR ART) are respectively schematic top and side cross-sectional views of a thermal imaging radiometer including an array of imaging microbolometers.
Figure 2:
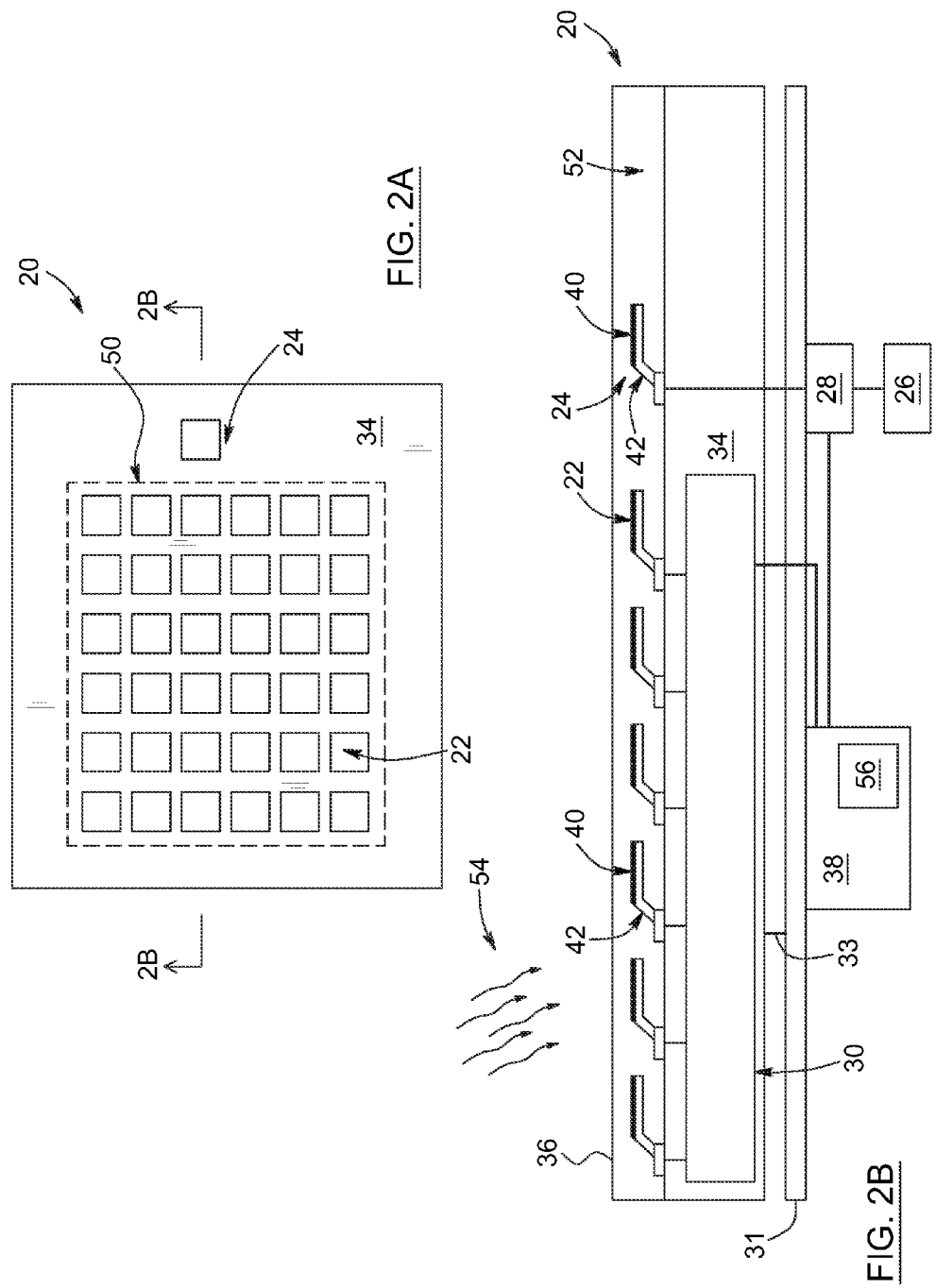
FIGS. 2A and 2B are respectively schematic top and side cross-sectional views of a thermal imaging radiometer according to one embodiment of the invention.

FIGS. 2A and 2B provide schematic top and side cross-sectional views, respectively, of an embodiment of a thermal imaging radiometer 20 to which the method 100 for detecting a loss of calibration thereof may be applied. The thermal imaging radiometer 20 includes an array of imaging microbolometers 22 and a gauge microbolometer 24 preferably disposed on a substrate 34. Further preferably, the array of imaging microbolometers 22 and the gauge microbolometer 24 are enclosed inside a hermetically sealed vacuum package 36, so that they are exposed to a same atmospheric environment 52.

The imaging microbolometers 22 and the gauge microbolometer 24 each preferably includes a sensor element 40 whose electrical resistance changes in response to a variation of temperature thereof and a support structure 42 that thermally isolates the sensor element 40 from the substrate 34.

It will be understood by those skilled in the art that the temperature $T_b$ of the sensor element 40 of each imaging microbolometer 22 obeys the following heat transfer equation, which governs the thermodynamic interactions between an imaging microbolometer 22 and its surrounding (see, e.g., US patent application Pub. No. 2010/0154554 to LE NOC et al. the entire contents of which are incorporated herein by reference):

$$C\frac{d(\Delta T)}{dt} + G(\Delta T) = P = P_{scene} + P_{elec} + P_{env}. \tag{1}$$

In Equation (1), C is the thermal capacity of the sensor element 40 (in units of J/K), G is its thermal conduction related to various thermal dissipation mechanisms (in units of W/K), $\Delta T = T_b - T_s$ is the difference between the temperature $T_b$ of the sensor 40 and the temperature $T_s$ of the substrate 34 (in units of K), and P is the total power incident on or applied to the sensor element 40 (in units of W). As one skilled in the art will readily understand, the power P may be expressed in terms of the following contributions:

the power $P_{scene}$ received by absorbing radiation 54 coming from a target scene through the window 50;

the power $P_{elec}$ due to Joule heating when an electrical stimulation is applied to the sensor element 40; and the power $P_{env}$ received by absorbing radiation emitted by the environment 52 inside the vacuum package 36.

As known in the art, the thermal radiation $P_{scene}$ from a target scene impinging on the sensor element 40 of each imaging microbolometer 22 causes the temperature $T_b$ thereof to increase, for example from a first temperature $T_{b1}$ to a second temperature $T_{b2}$, which in turn leads to a variation of its electrical resistance, for example from $R_{b1}$ to $R_{b2}$. This resistance change can be read out as an electrical output (e.g., a voltage or a current) by an imaging electrical readout circuit 30 connected to each imaging microbolometer 22. The electrical output of each imaging microbolometer may be processed by a processing unit 38 connected to the imaging electrical readout circuit 30 in order to yield a thermal image that may be displayed or stored for later use.

It will be understood by those skilled in the art that each imaging microbolometer of a thermal imaging radiometer must be properly calibrated in order to yield both accurate and reliable temperature measurements. Generally speaking, calibration of a thermal imaging radiometer requires establishing, for each imaging microbolometer of the array, a relationship between the electrical output thereof caused by absorption of thermal radiation from a target scene and the temperature of that source of thermal radiation. This means, in particular, that the amount of radiated power $P_{scene}$ needed to change the temperature of an imaging microbolometer from a temperature $T_{b1}$ to a temperature $T_{b2}$ or, equivalently, to change its electrical resistance from $R_{b1}$ to $R_{b2}$ should not vary over time if the imaging microbolometer remains well calibrated.

In practice, though, after a while the sensitivity of an imaging microbolometer eventually starts to diverge from its calibration settings. Such a calibration drift can occur for a number of reasons, including deteriorations in the vacuum levels of the vacuum package, manufacturing deficiencies, or aging of the imaging microbolometers.

In general, the different sources of calibration drift may be grouped into two categories, according to whether or not they degrade the sensitivity of the array of imaging microbolometers in a uniform manner. In particular, an important source of uniform calibration drifts in vacuum-packaged arrays of imaging microbolometers concerns pressure variations and degradation of the vacuum level, induced, for example, by outgassing or by the presence of microleaks within the package. Indeed, imaging microbolometers typically require a vacuum atmosphere below 10 mTorr to operate at their highest sensitivity. Thus, any rise of pressure inside the package may simultaneously impact on the validity of the calibration of all the imaging microbolometers of the package.

In view of the above and for the purposes of this description, a "uniform calibration drift" is understood herein to refer to a calibration drift that degrades in a substantially identical manner the thermal response of all the imaging microbolometers of a thermal imaging radiometer. Accordingly, the method 100 for detecting a loss of calibration of a thermal imaging radiometer according to an aspect of the present invention is mainly directed to detecting such uniform calibration drifts.

Still referring to FIGS. 2A and 2B, as mentioned above, the gauge microbolometer 24 and the imaging microbolometers 22 of the thermal imaging radiometer 20 are preferably enclosed within a same vacuum package 36, so that they share the same atmospheric environment 52. As a result, uniform calibration drifts (e.g., those due to variations in the base pressure of the vacuum package) that degrade the response of all the imaging microbolometers 22 should also degrade the response of the gauge microbolometer 24 by a same amount. This means that, in principle, a method capable of detecting a loss of calibration of the gauge microbolometer 24 could be used as a method to identify an overall loss of calibration of the imaging microbolometers 22 and thus of the thermal imaging radiometer 20.

From Equation (1), it will be understood by those skilled in the art that, as for an imaging microbolometer, a gauge microbolometer exhibits a loss of calibration whenever the power P needed to vary a temperature thereof from a first temperature $T_{b1}$ to a second temperature $T_{b2}$ changes over time. The power to be supplied to the gauge microbolometer need not be radiation power but could also, advantageously, be provided via electrical excitation of the gauge microbolometer. Indeed, since the gauge microbolometer is electrically resistive, it is well known that electrical excitation thereof provides heating thereto by virtue of the Joule effect.

Referring back to FIG. 5A, the detection method 100 generally consists in detecting a loss of calibration of a gauge microbolometer included therein. More specifically, and as will be further described hereinafter, the principle of the method lies in the recognition that detecting a loss of calibration of the electrical response of the gauge microbolometer can be interpreted as being indicative of a loss of calibration of the thermal response of the thermal imaging radiometer.

The detection method 100 first includes a step 102 of applying a first electrical stimulation to the gauge microbolometer which brings the gauge microbolometer to a first predetermined temperature $T_{b1}$ in a steady-state thermal regime.

In the context of this description, a "steady-state thermal regime" is understood to refer to a state wherein the temperature of the gauge microbolometer settles to a stable value (e.g., $T_{b1}$ in step 102) in response to a constant external excitation (e.g., the first electrical stimulation in step 102). With reference to Equation (1), it will be understood by those skilled in the art that a steady-state thermal regime is established after a time period t longer than the time constant C/G of the gauge microbolometer, typically of the order of 100 milliseconds but in some cases as short as 5 milliseconds, from which the first term on the left-hand side of Equation (1) becomes negligible compared to the second term. From this, one skilled in the art will also readily understand that the first electrical stimulation should be applied to the gauge microbolometer during a time period t>C/G for reaching a steady-state thermal regime.

The detection method 100 then involves a step 104 of applying a second electrical stimulation to the gauge microbolometer which brings the gauge microbolometer to a second predetermined temperature $T_{b2}$ in a steady-state thermal regime. Steps 102 and 104 are performed under substantially identical radiation exposure conditions.

Hence, step 104 also requires that the second electrical stimulation be applied to the gauge microbolometer for a sufficiently long time for it to reach $T_{b2}$ in a steady-state thermal regime. Furthermore, the expression "performed under substantially identical radiation exposure conditions" is understood herein to refer to the fact that the radiative environment, which may be accounted for mathematically by the terms $P_{scene}$ et $P_{env}$ in Equation (1), should not vary substantially during the time elapsed between steps 102 and 104. In other words, steps 102 and 104 should be performed in the same radiative environment. To ensure this, steps 102 and 104 are preferably performed while preventing exposure of the gauge microbolometer to the radiation $P_{scene}$ from a target scene, for example by closing a shutter of the thermal imaging radiometer.

The first and second predetermined temperatures $T_{b1}$ and $T_{b2}$ are preferably selected so as to be above an operating temperature of the thermal imaging radiometer, which is typically about 30 degrees Celsius. For example, in some embodiments, $T_{b1}$ and $T_{b2}$ are both a few kelvins above the operating temperature of the thermal imaging radiometer and differ from each other by a few kelvins.

Advantageously, the sensitivity of the detection method 100 may be improved by enclosing the array of imaging microbolometers and the gauge microbolometer inside a hermetically sealed vacuum package, such as the vacuum package 36 shown in the embodiment of FIGS. 2A and 2B. As mentioned above, this vacuum package is preferably sealed at a pressure of approximately 10 mTorr or less to ensure maximum sensitivity. As a result, the array of imaging microbolometers and the gauge microbolometer are thus exposed to a same atmospheric environment, thereby helping to ensure that uniform calibration drifts affecting the response of all the imaging microbolometers will also affect the response of the gauge microbolometer and be detectable by monitoring the electrical response thereof.

Referring to the exemplary embodiment shown in FIGS. 2A and 2B, steps 102 and 104 also preferably include applying the first and second electrical stimulations to a sensor element 40 of the gauge microbolometer 24, the sensor element 40 having a temperature-dependent electrical resistance $R_b(T_b)$. In this case, the first and second predetermined temperatures $T_{b1}$ and $T_{b2}$ correspond to a first and a second electrical resistance $R_{b1}$ and $R_{b2}$ of the sensor element, respectively. It will be understood by those skilled in the art that by virtue of the temperature coefficient of resistance (TCR) $(dR_b/dT_b)/R_b$ of the sensor element of the gauge microbolometer, the first and second electrical resistances $R_{b1}$ and $R_{b2}$ are completely determined by the first and second predetermined temperatures $T_{b1}$ and $T_{b2}$.

Further preferably, steps 102 and 104 include the substeps of providing 112 a gauge electrical readout circuit connected to the gauge microbolometer, monitoring 114 the electrical resistance of the sensor element of the gauge microbolometer and, during the monitoring substep 114, adjusting 116 the first and second electrical stimulations until the first and second electrical resistances $R_{b1}$ and $R_{b2}$ are reached, respectively. For example, the gauge microbolometer 24 included in the exemplary embodiment shown in FIGS. 2A and 2B is connected to a gauge electrical readout circuit 28. It is to be noted that exemplary embodiments for the gauge electrical readout circuit will be described hereinbelow, with reference to FIGS. 3 and 4. Also preferably, steps 102 and 104 further include applying the first and second electrical stimulations with an electrical power source (e.g., a voltage source or a current source), which may be either internal or external to the gauge electrical readout circuit.

In some embodiments, steps 102 and 104 preferably include applying a first and a second applied voltage $V_1$ and $V_2$ with a voltage source. In other embodiments, steps 102 and 104 preferably include applying a first and a second applied current $i_1$ and $i_2$ with a current source.

Preferably, and still referring to FIG. 5A, steps 102 and 104 together form a step 120 of applying a binary-valued electrical stimulation having a first and a second value corresponding to the first and second electrical stimulations, respectively.

In one embodiment, the binary-valued electrical stimulation may consist of a step-function having a minimum and a maximum value, each corresponding to either one of the first and second electrical stimulations. In another embodiment, the binary-valued electrical stimulation may consist of a periodic time-varying binary-valued electrical stimulation (e.g., a square wave) having a minimum and a maximum value, each corresponding to either one of the first and second electrical stimulations. In this case, the frequency of the periodic time-varying binary-valued electrical stimulation must be low enough to achieve a steady-state thermal regime during each half period thereof. Considering, as indicated above, that a steady-state thermal regime may be achieved in a time as short as 5 milliseconds, in typical embodiments the frequency of the binary-valued electrical stimulation is generally kept below 100 Hz.

Following steps 102 and 104, the embodiment of the detection method 100 shown in FIG. 5A next involves a step 106 of determining a measured ohmic responsivity of the gauge microbolometer, the measured ohmic responsivity being representative of a difference between the first and second electrical stimulations.

In the context of this description, the measured ohmic responsivity $\Omega_b$ of the gauge microbolometer represents a differential relation of the change of electrical resistance $dR_b = R_{b2} - R_{b1}$ of the gauge microbolometer to a change of electrical heating power $dP_b = P_{b2} - P_{b1}$ thereof. Here, $P_{b1}$ and $P_{b2}$ correspond to the amount of electrical power $P_{elec}$ supplied to the gauge microbolometer by applying the first and second electrical stimulations, respectively.

It will be appreciated by those skilled in the art that the measured ohmic responsivity $\Omega_b$ constitutes a useful figure-of-merit parameter for detecting a variation over time in the amount of electrical power $P_{b2} - P_{b1}$ needed to change the temperature of the gauge microbolometer from $T_{b1}$ to $T_{b2}$ and thus for detecting a loss of calibration of a thermal imaging radiometer, as made possible by the detection method 100 embodied in FIG. 5A.

Moreover, it should be emphasized that applying two successive electrical stimulations to bring the gauge microbolometer to two fixed predetermined temperatures $T_{b1}$ and $T_{b2}$ helps compensating for variations over time of the environmental conditions between successive applications of the detection method 100. Indeed, Equation (1) indicates that the equilibrium temperature of the bolometer $T_b$ is not uniquely related to the electrical power $P_{elec}$ but also to the substrate temperature ($\Delta T = T_b - T_s$), the absorbed radiation from the target scene $P_{scene}$ and the absorbed radiation from the environment $P_{env}$. Hence, using a differential detection based on performing two successive measurements at two fixed predetermined temperatures $T_{b1}$ and $T_{b2}$ reduces the influence of terms other than $P_{elec}$ in Equation (1), thus mitigating the influence of $T_s$, and cancelling the influence of $P_{scene}$ and $P_{env}$ on the measurements. In particular, such a measurement scheme improves the tolerance of the detection method 100 against ambient temperature compared to an absolute measurement scheme wherein a single electrical stimulation is applied to the gauge microbolometer and to a differential measurement scheme wherein only the difference between $T_{b1}$ and $T_{b2}$ is maintained constant.

Mathematically, the measured ohmic responsivity may be expressed as (see, e.g., US patent application Pub. No. US 2010/0154554 to LE NOC et al.):

$$\Omega_b = \frac{dR_b}{dP_b} = \frac{R_{b2} - R_{b1}}{P_{b2} - P_{b1}} = \frac{R_{b2} - R_{b1}}{\frac{V_{b2}^2}{R_{b2}} - \frac{V_{b1}^2}{R_{b1}}} = \frac{R_{b2} - R_{b1}}{R_{b2}i_{b2}^2 - R_{b1}i_{b1}^2}. \quad (2)$$

In Equation (2), $V_{b1}=R_{b1}i_{b1}$ and $V_{b2}=R_{b2}i_{b2}$ are the values of the voltage $V_b=R_b i_b$ across the gauge microbolometer in response to the first and second electrical stimulations, respectively. Likewise, $i_{b1}$ and $i_{b2}$ are the values of the current $i_b$ passing through the gauge microbolometer in response to the first and second electrical stimulations, respectively.

As can be seen from Equation (2), the ohmic responsivity $\Omega_b$ of the gauge microbolometer can be determined by measurement since it is related to known parameters (i.e. $R_{b1}$ and $R_{b2}$ are known since they are completely defined by the predetermined temperatures $T_{b1}$ and $T_{b2}$) and to measurable parameters (e.g., $P_{b1}$, $P_{b2}$, $V_{b1}$, $V_{b2}$, $i_{b1}$ and $i_{b2}$). In particular, it will be readily understood by those skilled in the art that the parameters $P_{b1}$, $P_{b2}$, $V_{b1}$, $V_{b2}$, $i_{b1}$ and $i_{b2}$ may be determined from (i) the knowledge of the first and second electrical stimulations and (ii) by using a transfer function $f_b$ related to the architecture of the gauge electrical readout circuit connected to the gauge microbolometer.

The principle of determining a measured value of the ohmic responsivity of the gauge microbolometer will be described in more detail later with reference to FIGS. 3 and 4, wherein exemplary and non-limitative embodiments of the gauge electrical readout circuit connected to the gauge microbolometer will be presented.

The method 100 further involves comparing 108 the measured ohmic responsivity $\Omega_b$ with a reference ohmic responsivity $\Omega_{b0}$ of the gauge microbolometer. The expression "reference ohmic responsivity" is understood herein to refer to the value of the ohmic responsivity of the gauge microbolometer when it is considered to be properly calibrated.

Preferably, the reference ohmic responsivity $\Omega_{b0}$ of the gauge microbolometer should correspond to the same first and second predetermined temperatures $T_{b1}$ and $T_{b2}$ as for the measured ohmic responsivity $\Omega_b$. The reference ohmic responsivity $\Omega_{b0}$ then provides a suitable reference value against which $\Omega_b$ may be compared in order to determine a loss of calibration of the electrical response of the gauge microbolometer and thus a loss of calibration of the thermal imaging radiometer.

The reference ohmic responsivity $\Omega_{b0}$ may be determined as part of the initial calibration setup of the thermal imaging radiometer, for example during the manufacturing of the radiometer or prior to a first use thereof. Alternatively, the determination of $\Omega_{b0}$ may be performed following a recalibration procedure of the thermal imaging radiometer. Preferably, the reference ohmic responsivity $\Omega_{b0}$ is stored in a memory element so that it is readily available in step 108 for comparison with the measured ohmic responsivity $\Omega_b$.

Furthermore, in embodiments wherein the operating temperature of the thermal imaging radiometer is not regulated, values for reference ohmic responsivity $\Omega_{b0}$ may be determined for several pairs of first and second predetermined temperatures $T_{b1}$ and $T_{b2}$ within the range of operating temperature of the thermal imaging radiometer. For example, if the operating temperature is −20 degrees Celsius, then the first and second predetermined temperatures $T_{b1}$ and $T_{b2}$ could be −15 and −13 degrees Celsius, respectively, whereas if the operating temperature is −10 degrees Celsius, then the first and second predetermined temperatures $T_{b1}$ and $T_{b2}$ could be −5 and −3 degrees Celsius, respectively, and so on until the maximum value of operating temperature is reached. In these embodiments, when the detection method 100 is performed, the first and second predetermined temperatures $T_{b1}$ and $T_{b2}$ at which the measured ohmic responsivity $\Omega_b$ of the gauge microbolometer is determined may be selected so as to be slightly above the current operating temperature of the thermal imaging radiometer.

The detection method 100 finally includes signaling 110 a loss of calibration of the thermal imaging radiometer when the measured ohmic responsivity $\Omega_b$ and the reference ohmic responsivity $\Omega_{b0}$ differ by more than a predetermined threshold, For example, in some embodiments, the predetermined threshold may be equal to the maximum permissible error specified by the manufacturer, which may be of the order of 1 to 2 percent. In such cases, a loss of calibration will be signaled when $\Omega_b$ and $\Omega_{b0}$ differ by more than 1 to 2 percent, which is typically the warranted accuracy of most commercial thermal imaging radiometers. More precisely, the threshold value should preferably be selected so that the targeted accuracy of the radiometer. On the other hand, if the difference between $\Omega_b$ and $\Omega_{b0}$ is below the predetermined threshold, the calibration of the thermal imaging radiometer is still considered valid and there is no need for taking action.

In some embodiments of the invention, the steps of comparing 108 and signaling 110 may be performed by a processing unit, for example a computer, a microprocessor or a field-programmable gate array (FPGA), connected to the gauge electrical readout circuit. Alternatively, in other embodiments, these steps may be performed directly by the gauge electrical readout circuit itself.

Furthermore, the step of signaling 110 may include providing a pass or fail verdict, which may be displayed on a viewing device, for example on a PC, on the screen of a handheld monitor, or on any other appropriate viewing device. The result of the pass or fail verdict may optionally be stored in a memory element provided internally or externally to the processing unit. The signaling 110 may also be communicated to a user by a visual indicator, for example an LED indicator, an audio indicator, or a combination thereof. The signaling 110 may further include storing 118 an end result of the comparing 108 in a memory element. This end result may be linked, as metadata, to thermal images captured by the thermal imaging radiometer, so as to ensure, for example, that thermal images recorded when the thermal imaging radiometer exhibits a loss of calibration may be readily detected (and optionally corrected, as described below) a posteriori, for example after field measurements have been performed.

Figure 5B:
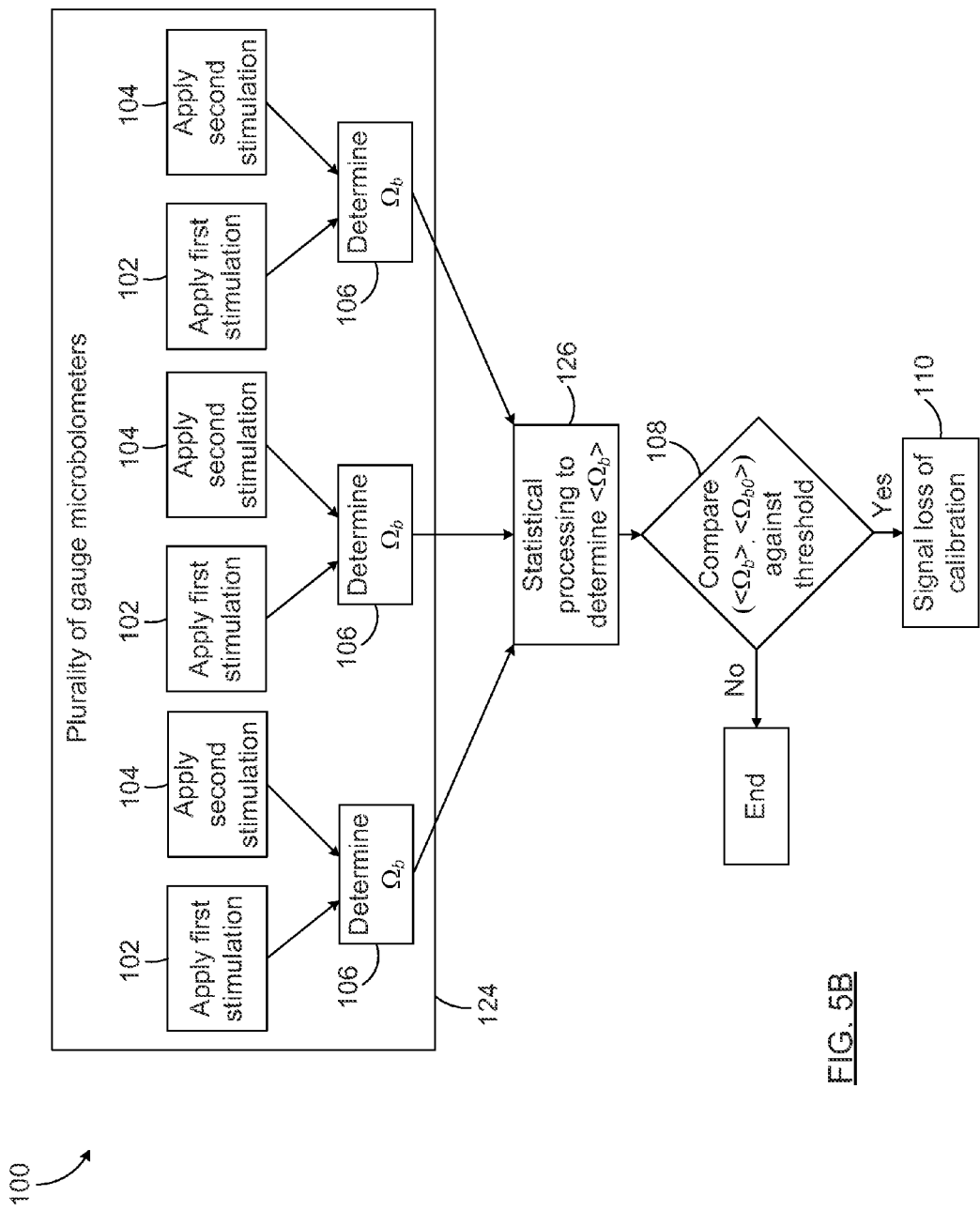

Referring now to the flow chart of FIG. 5B, there is shown another embodiment of the method 100 for detecting a loss of calibration of a thermal imaging radiometer. Compared to the embodiment of FIG. 5A, the embodiment of FIG. 5B preferably involves a step 124 of performing steps 102, 104 and 106 as described above for a plurality of gauge microbolometers, preferably but not necessarily identical to each other, thereby obtaining a plurality of values of the measured ohmic responsivity $\Omega_b$.

The embodiment of FIG. 5B also preferably includes performing a statistical processing 126 of the plurality of values of measured responsivity $\Omega_b$ in order to yield an average measured ohmic responsivity $<\Omega_b>$. For example, if N gauge microbolometers provide N values of measured responsivity $\Omega_{b,n}$ (n=1, . . . , N) then the average values of measured responsivity $<\Omega_b>$ to be considered in embodiments of the method 100 for detecting a loss of calibration of thermal imaging radiometers may be the average values of the M gauges lying inside the standard deviation range of the data. This average measured ohmic responsivity $<\Omega_b>$ may then be compared 108 with a reference ohmic responsivity $\Omega_{b0}$ of the gauge microbolometer. Preferably, the statistical processing is performed by a processing unit such as a computer, a microprocessor or a FPGA.

It should be noted that for the embodiment of FIG. 5B, the reference ohmic responsivity $\Omega_{b0}$ may also represent an average reference ohmic responsivity $<\Omega_{b0}>$, that is, an appropriate statistical average of the reference ohmic responsivity $\Omega_{b0}$ of the plurality of gauge microbolometers.

As one skilled in the art will readily understand, using a plurality of gauge microbolometers helps increasing the precision and reliability of the method 100 for detecting a loss of calibration of thermal imaging radiometers compared to embodiments wherein the measured ohmic responsivity $\Omega_b$ is determined from a single gauge microbolometer. Indeed, in the embodiment of FIG. 5A, factors such as malfunctioning and fabrication errors of the gauge microbolometer as well as premature aging thereof relative to the imaging microbolometers may lead to erroneous detections of calibration drifts. However, in the embodiment of FIG. 5B, an inaccurate response of only one gauge microbolometer will tend to get averaged out by the responses of all the other gauge microbolometers. Furthermore, the response of gauge microbolometers that departs significantly from that of the other gauge microbolometers (outliers) may be discarded when determining the average measured and reference ohmic responsivities $<\Omega_b>$ and $<\Omega_{b0}>$, so that only relevant values of $\Omega_b$ and $\Omega_{b0}$ are used to compute $<\Omega_b>$ and $<\Omega_{b0}>$, respectively.

Thermal Imaging Radiometer

According to another aspect of the invention, there is provided a thermal imaging radiometer. Referring back to FIGS. 2A and 2B, the thermal imaging radiometer 20 includes an array of imaging microbolometers 22 and a gauge microbolometer 24 for detecting a loss of calibration of the thermal imaging radiometer 20 using the detection method 100 exemplified in the embodiment shown in FIG. 5A. It should be noted that while the imaging microbolometers 22 are arranged to form a two-dimensional array in the embodiment of FIG. 2A, they may alternatively be configured as a linear array in other embodiments.

Most arrays of imaging microbolometers are specifically adapted to detect radiation in the infrared portion of the electromagnetic spectrum, particularly in the 8-14 micrometer (μm) wavelength region. However, it must be noted that although thermal imaging radiometers according to embodiments of the invention are preferably directed to the infrared spectral range, they could also be used in other regions of the electromagnetic spectrum without departing from the scope of the invention.

Referring back to FIGS. 2A and 2B, the array of imaging microbolometers 22 and the gauge microbolometer 24 are preferably disposed on a substrate 34 (e.g., a silicon wafer) via standard CMOS fabrication processes and enclosed inside a hermetically sealed vacuum package 36, so as to ensure that they are exposed to a same atmospheric environment 52. Alternatively, in other embodiments, the array of imaging microbolometers 22 and the gauge microbolometer 24 may be disposed on different substrates enclosed within a same vacuum package 36.

The hermetically sealed vacuum package 36 may provide a vacuum level of typically less than 10 mTorr thereinside, thus ensuring that the imaging microbolometers 22 and the gauge microbolometer 24 operate at their highest sensitivity. The vacuum package 36 may further preferably include a window 50 for allowing radiation 54 from a target scene to impinge on the array of imaging microbolometers 22. Depending on the intended use and design constraints, the window 50 may or may not extend above the gauge microbolometer 24.

The imaging microbolometers 22 and the gauge microbolometer 24 each preferably includes a sensor element 40 whose electrical resistance changes in response to a variation of temperature thereof and a support structure 42 to provide thermal isolation between the sensor element 40 and the substrate 34.

In some embodiments, the sensor element 40 may have a width and length each between 0.1 and 250 μm, and a thickness between 0.1 and 5 μm. The sensor element 40 is made of a material having a high TCR near room temperature, preferably of at least 0.5% per kelvin, such as a vanadium oxide material, a titanium oxide material or an amorphous silicon material. In particular, vanadium oxide $VO_x$ with $1<x<3$ has received much attention and intensive study, in part due to its large TCR of about 2% per kelvin near 20 degrees Celsius. However, it will be understood by those skilled in the art that the composition of the sensor element 40 of the imaging microbolometers 22 and of the gauge microbolometer 24 is not limited to those cited above. Any suitable material or alloy having a suitable TCR is considered to be encompassed within the scope of the present invention.

The support structure 42 preferably provides enough mechanical rigidity for suspending the sensor element 40 at least 0.1 μm above the substrate and it provides a path for electrical connection from the sensor element 40 to the substrate 34. As known in the art, the support structure 42 may be made of silicon nitride or silicon dioxide materials or any other suitable materials providing suitable mechanical rigidity. In some embodiments, the support structure may be coated with a metallic layer to ensure electrical conduction between the sensor element 40 and the substrate 34.

Preferably, and still referring to FIGS. 2A and 2B, the imaging microbolometers 22 and the gauge microbolometer 24 are substantially identical. By "substantially identical", it should be understood that their physical characteristics are similar enough so that a loss of calibration affecting the gauge microbolometer 24 will be representative of a loss of calibration affecting the imaging microbolometers 22. As one skilled in the art will also understand, designing the imaging microbolometers 22 and the gauge microbolometer 24 to be identical also facilitates the fabrication of the thermal imaging radiometer 20.

In other embodiments, a gauge microbolometer 24 that is more responsive than the imaging microbolometers 22 could be selected in order to detect a smaller loss of calibration. However, the response of the gauge microbolometer 24 as a function of variations in the base pressure of the vacuum package 36 may then be different from that of the imaging microbolometers 22. When this is the case, both the gauge microbolometer 24 and the imaging microbolometers 22 should be calibrated as a function of pressure, which may not be practical, so that a loss of calibration of the gauge microbolometer 24 is correctly interpreted as an overall loss of calibration of the imaging microbolometers 22. A more sensitive gauge microbolometer may be helpful for earlier detection of a pressure drift, for example to relate the degradation to particular ambient conditions, and for more accurate correction, as described below.

However, the imaging microbolometers 22 and the gauge microbolometer 24 are adapted to perform different functions. On the one hand, the imaging microbolometers 22 each absorbs thermal radiation 54 from a target scene and together they provide a pixelated thermal image thereof. More specifically, incoming radiation 54 heats the sensor element 40 of each imaging microbolometer 22, causing a variation in the electrical resistance thereof. This resistance change can in turn be read out as a change in a bias current or voltage by an imaging electrical readout circuit 30 (e.g., a CMOS device) embedded in the substrate 34 and connected to each of the imaging microbolometers 22. Alternatively, the imaging electrical readout circuit 30 may be provided externally to the substrate 34. Finally, the electrical outputs of the imaging microbolometers 22 may be processed by a processing unit 38 connected to the imaging electrical readout circuit 30 in order to yield a thermal image.

On the other hand, the gauge microbolometer 24 is adapted for detecting a loss of calibration of the thermal imaging radiometer 20 by performing the detection method 100 described above and exemplified in the embodiment shown in FIG. 5A. As shown in FIGS. 2A and 2B, the gauge microbolometer 24 is preferably located on a periphery of the array of imaging microbolometers 22 rather than inside the array. Disposing the gauge microbolometer 24 inside the array could introduce a non-imaging microbolometer, thus creating a dead pixel in the thermal images captured by the thermal imaging radiometer 20.

Advantageously, and with reference to FIGS. 7A to 7D, the thermal imaging radiometer 20 may also include a plurality of gauge microbolometers 24, which are preferably, but not necessarily, identical to each other. As mentioned above in relation to the detection method 100 illustrated in FIG. 5B, providing a plurality of gauge microbolometers rather than a single gauge microbolometer improves the reliability of the method 100 for detecting a loss of calibration of thermal imaging radiometers since the response of one of a few faulty gauge microbolometers will tend to get averaged out by or neglected compared to the responses of all the other functional gauge microbolometers.

Furthermore, the plurality of gauge microbolometers 24 may be arranged according to various configurations with respect to the array of imaging microbolometers without departing from the scope of the invention. For example, in the embodiment of FIG. 7A one gauge microbolometer 24 is provided next to each edge of the array of imaging microbolometers 22, while in the embodiments of FIGS. 7B and 7C the plurality of gauge microbolometers 24 is disposed along an edge and along the whole periphery of the array of imaging microbolometers 22, respectively.

Referring back to FIGS. 2A and 2B, the thermal imaging radiometer 20 also includes an electrical power source 26 connected to the gauge microbolometer 24. The electrical power source 26 is configured to apply, under substantially identical radiation exposure conditions, a first electrical stimulation to the gauge microbolometer 24 which brings the gauge microbolometer 24 to a first predetermined temperature $T_{b1}$ in a steady-state thermal regime, and a second electrical stimulation to the gauge microbolometer 24 which brings the gauge microbolometer 24 to a second predetermined temperature $T_{b2}$ in a steady-state thermal regime. In the context of the present description, the expression "electrical power source" is understood to refer to any device capable of providing electrical energy. For example, the electrical power source 26 may be embodied by a voltage source or by a current source and may be provided either internally, as shown in FIG. 2B, or externally to the substrate 34.

It will be understood that the electrical power source 26 may apply each of the first and second electrical stimulations by performing steps 102 and 104 of the detection method 100 described above and exemplified in FIG. 5A. In particular, and with reference to Equation (1), the electrical power source 26 must be adapted to apply the first and second electrical stimulations for a time period t>C/G (e.g. typically about 100 milliseconds, but in some cases as short as 5 milliseconds) in order to bring the gauge microbolometer 24 to the first and second predetermined temperatures $T_{b1}$ and $T_{b2}$ in a steady-state thermal regime. Likewise, the requirement of "substantially identical radiation exposure conditions" defined earlier means that the electrical power source 26 should be adapted to apply the first and second electrical stimulations within a time interval sufficiently short to ensure that the radiative environment of the gauge microbolometer 24 does not vary significantly.

In some embodiments of the invention, the electrical power source 26 is a binary-wave electrical power source 26 adapted to apply a periodic time-varying binary-valued electrical stimulation characterized by a minimum and a maximum value, each corresponding to either one of the first and second electrical stimulations. As discussed above, the electrical power source 26 in such embodiments should be capable of generating a periodic time-varying binary-valued electrical stimulation at a frequency that is low enough (e.g., typically below 100 Hz) for a steady-state thermal regime to be attained during each half period thereof.

Figure 7A:
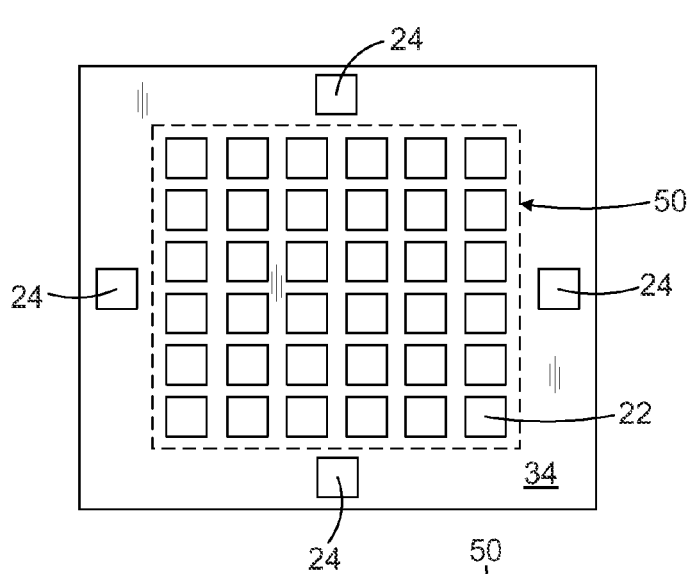
FIGS. 7A to 7C are schematic top views of a thermal imaging radiometer according to embodiments of the invention, wherein the radiometer includes an array of imaging microbolometers and a plurality of gauge microbolometers disposed at various locations relative to the array.
Figure 7B:
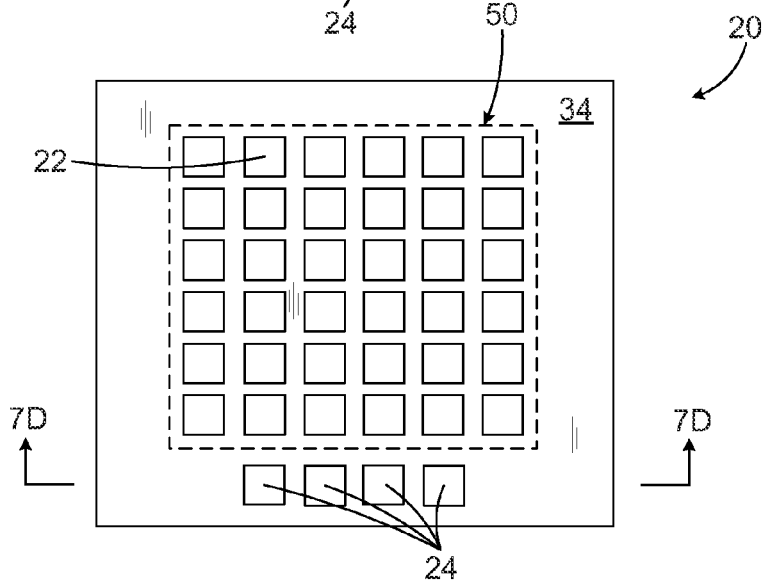
Figure 7C:
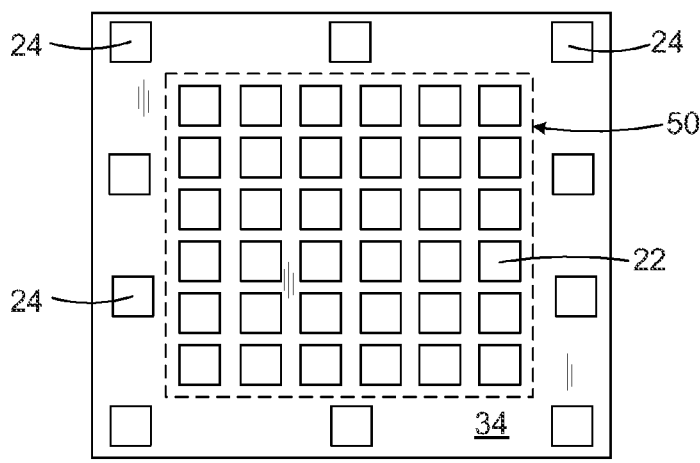
Figure 7D:
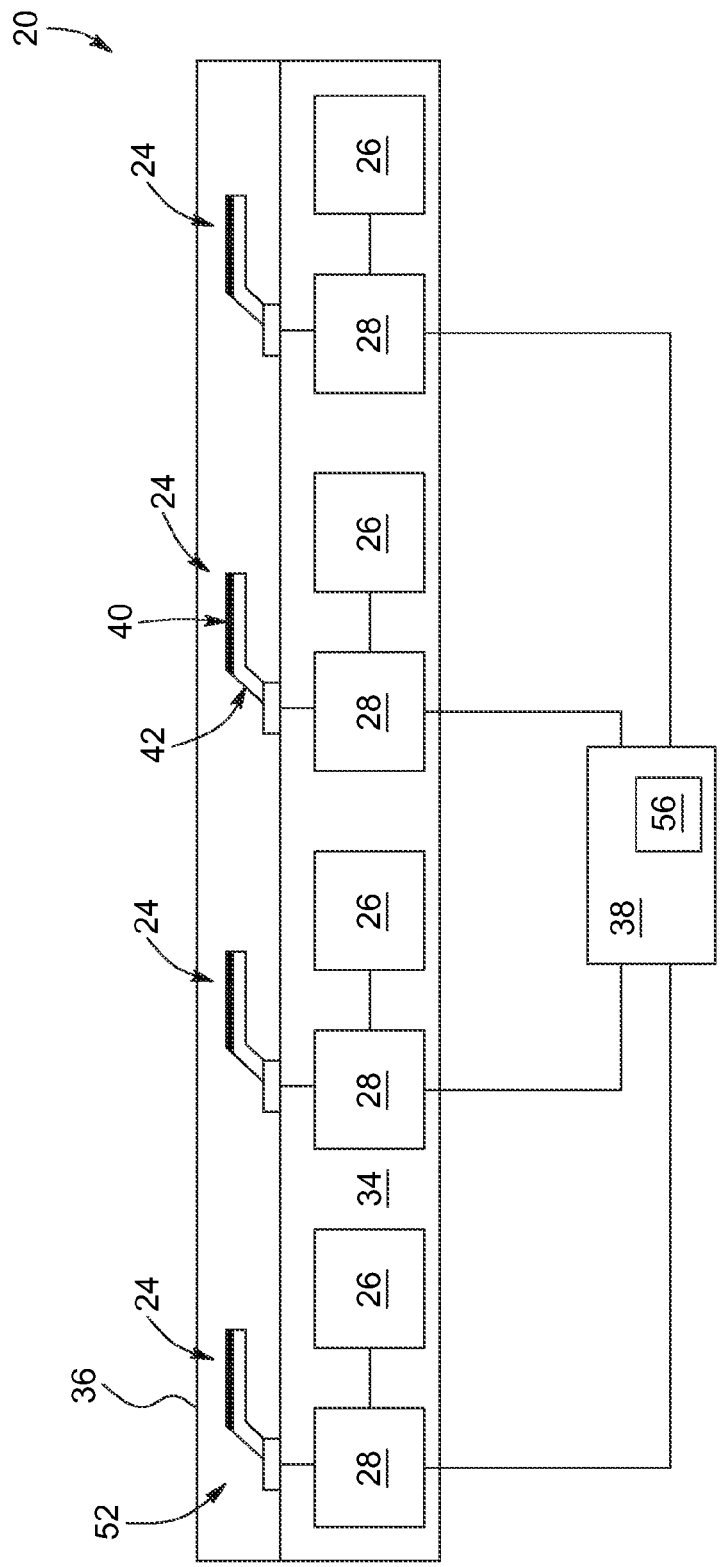
FIG. 7D is a cross-sectional side view of the thermal imaging radiometer of FIG. 7B.

Moreover, in embodiments of the invention wherein the thermal imaging radiometer 20 includes a plurality of gauge microbolometers 24, each gauge microbolometer 24 may be connected to its own electrical power source 26, as shown in FIG. 7D, which shows a cross-sectional side view of the embodiment of FIG. 7B. In this case, the electrical power source 26 connected to each gauge microbolometer 24 is configured to apply the first and second electrical stimulations by following steps 102 and 104 of the detection method 100 illustrated in FIG. 5A. Alternatively, in other embodiments, a single electrical power source 26 may be connected to all of the plurality of gauge microbolometers 24.

Referring back to FIGS. 2A and 2B, the thermal imaging radiometer 20 further includes a gauge electrical readout circuit 28 connected to the gauge microbolometer 24. The gauge electrical readout circuit 28 may be a CMOS device and may be either embedded in the substrate 34, or provided externally to the substrate 34, as shown in FIG. 2B. For example, in some embodiments, the gauge microbolometer 24 is built at the same time and on the same substrate 34 as that of the array of imaging microbolometers 22, while the gauge electrical readout circuit 28 is provided externally to the gauge microbolometer 24. In these embodiments, the substrate 34 is in a vacuum package 36 mounted on a printed circuit board (PCB) 31 and connected thereto through electrical connections 33. The printed circuit board 31 includes or provides connections to the gauge electrical readout circuit 28. The gauge electrical readout circuit 28 may preferably include a voltmeter, an ammeter, a wattmeter, and the like. Moreover, the electrical power source 26 is either internal or external to the gauge electrical readout circuit 28, as shown in FIG. 2B for the latter case.

Preferably, the gauge microbolometer 24 and the imaging microbolometers 22 are not connected to a same electrical readout circuit. Indeed, referring to FIGS. 2A and 2B, the gauge electrical readout circuit 28 and the imaging electrical readout circuit 30 generally differ in many ways, most notably in their function. In particular, the gauge and imaging electrical readout circuits 28 and 30 should be connected to different electrical power sources, since the electrical stimulation to be applied to the imaging microbolometers 22 is typically strictly constant, whereas the electrical stimulation to be applied to the gauge microbolometer 24 should be allowed to be adjustable at least between the first and second electrical stimulations defined above. It should also be noted that another advantage of disposing the gauge microbolometer 24 along the periphery of the array of imaging microbolometers is that it makes the fabrication of the gauge electrical readout circuit 28 easier.

The gauge electrical readout circuit 28 is mainly configured to determine a measured ohmic responsivity $\Omega_b$ of the gauge microbolometer 24, the measured ohmic responsivity $\Omega_b$ being representative of a difference between the first and second electrical stimulations. It will be understood that the gauge electrical readout circuit 28 may determine $\Omega_b$ by performing step 106 of the detection method 100 described above and exemplified in FIG. 5A.

Referring again to Equation (2), the measured ohmic responsivity $\Omega_b$ of the gauge microbolometer 24 represents a differential relation of the change of electrical resistance $dR_b = R_{b2} - R_{b1}$ of the gauge microbolometer to a change of electrical heating power $dP_b = P_{b2} - P_{b1}$ thereof. Here, $R_{b1}$ and $R_{b2}$ are a first and a second electrical resistance corresponding to the first and second predetermined temperature $T_{b1}$ and $T_{b2}$ by virtue of the temperature-dependent electrical resistance $R_b(T_b)$ of the sensor element 40 of the gauge microbolometer 24. Likewise, $P_{b1}$ and $P_{b2}$ are the amount of electrical power supplied by the electrical power source 26 to the gauge microbolometer 24 upon applying the first and second electrical stimulations, respectively.

Moreover, as discussed above, Equation (2) indicates that a measured ohmic responsivity $\Omega_b$ of the gauge microbolometer can be determined because it is related to known parameters (i.e. $R_{b1}$ and $R_{b2}$) and to electrical parameters that can be measured by the gauge electrical readout circuit 28 connected to the gauge microbolometer 24 (e.g., $P_{b1}$, $P_{b2}$, $V_{b1}$, $V_{b2}$, $i_{b1}$ and $i_{b2}$).

To accomplish this, the gauge electrical readout circuit 28 is preferably configured to monitor the electrical resistance $R_b$ of the sensor element 40 of the gauge microbolometer 24, while the electrical power source 26 is preferably configured to adjust the first and second electrical stimulations until the first and second electrical resistances $R_{b1}$ and $R_{b2}$ are reached, respectively. As one skilled in the art will readily understand, the electrical parameters of the gauge microbolometer 24, for example $V_{b1}$ et $V_{b2}$, can then be determined from the values of the first and second electrical stimulations, for example $V_1$ and $V_2$, that must be applied by the electrical power source 26 to reach the first and second electrical resistances $R_{b1}$ and $R_{b2}$, as well as from the transfer function of the gauge electrical readout circuit 28.

In embodiments of the thermal imaging radiometer 20 that includes a plurality of gauge microbolometers 24, each of the plurality of gauge microbolometers 24 may be connected to a respective gauge electrical readout circuit 28, as shown in FIG. 7D. In this case, each gauge electrical readout circuit 28 is configured to determine a respective measured ohmic responsivity $\Omega_b$, thereby providing a plurality of values of measured ohmic responsivity $\Omega_b$ for the plurality of gauge microbolometers 24. Alternatively, in other embodiments, the plurality of gauge microbolometers 24 may be connected to a single gauge electrical readout circuit 28 configured to determine the plurality of values of measured ohmic responsivity $\Omega_b$ for the plurality of gauge microbolometers 24.

Referring back to FIGS. 2A and 2B, the thermal imaging radiometer 20 finally includes a processing unit 38 connected to the gauge electrical readout circuit 28 and configured to compare the measured ohmic responsivity $\Omega_b$ with a reference ohmic responsivity $\Omega_{b0}$ of the gauge microbolometer 24. When the measured ohmic responsivity $\Omega_b$ and the reference ohmic responsivity $\Omega_{b0}$ differ by more than a predetermined threshold, the processing unit 38 is further configured to signal a loss of calibration of the thermal imaging radiometer 20. As mentioned above, the predetermined threshold may be equal to the maximum permissible error specified by the manufacturer, which may be, for example, of the order of 1 to 2 percent.

In some embodiments, the signaling of a loss of calibration may be displayed on a monitor (not shown), for example on the screen of a PC or that of a handheld monitor, or via any other appropriate viewing device. In other embodiments, the signaling may be communicated to a user via a visual indicator, such as an LED indicator, an audio indicator, or a combination thereof. An end result of the signaling may be stored in a memory element 56, for example a serial flash memory, preferably included in the processing unit 38. The end result may be also linked, as metadata, to thermal images captured by the thermal imaging radiometer 20. This may ensure, for example, that thermal images recorded when the thermal imaging radiometer exhibits a loss of calibration may be readily detected (and optionally corrected, as described below) a posteriori, for example after field measurements have been performed. In other embodiments, the memory element 56 may be provided externally to the processing unit 38.

Preferably, the memory element 56 may also be adapted for storing the reference ohmic responsivity $\Omega_{b0}$, which as discussed above, may be determined as part of either the initial calibration setup of the thermal imaging radiometer 20 or after recalibration thereof.

It will be understood by those skilled in the art that the processing unit 38 is also generally configured to perform steps 108 and 110 of the detection method 100 described above. Preferably, the processing unit 38 may be for example embodied by a computer, a microprocessor or a FPGA. The processing unit 38 may be provided either externally, as in FIG. 2B, or internally of the substrate 34. Moreover, the imaging microbolometers 22 and the gauge microbolometer 24 may either share the same processing unit 38, as in FIG. 2B, or be provided with two separate processing units.

Referring to FIG. 7D, the processing unit 38 is preferably configured to compute a statistical average of the plurality of values of measured ohmic responsivity $\Omega_b$ determined by the plurality of gauge electrical readout circuits 28, thereby yielding an average measured ohmic responsivity $<\Omega_b>$. This average measured ohmic responsivity $<\Omega_b>$ may be then compared with the reference ohmic responsivity $\Omega_{b0}$, which may also an average reference ohmic responsivity $<\Omega_{b0}>$ of the plurality of gauge microbolometers.

Exemplary Embodiments of the Gauge Electrical Readout Circuit

The principle of operation of the electrical power source 26 and of the gauge electrical readout circuit 28 connected to the gauge microbolometer 24 of the thermal imaging radiometer 20 shown in FIGS. 2A and 2B will now be described in more detail hereinbelow in the context of two examples, given for illustrative purposes only. These two examples correspond to the embodiments of the gauge electrical readout circuits 28 shown in FIGS. 3 and 4.

Figure 3:
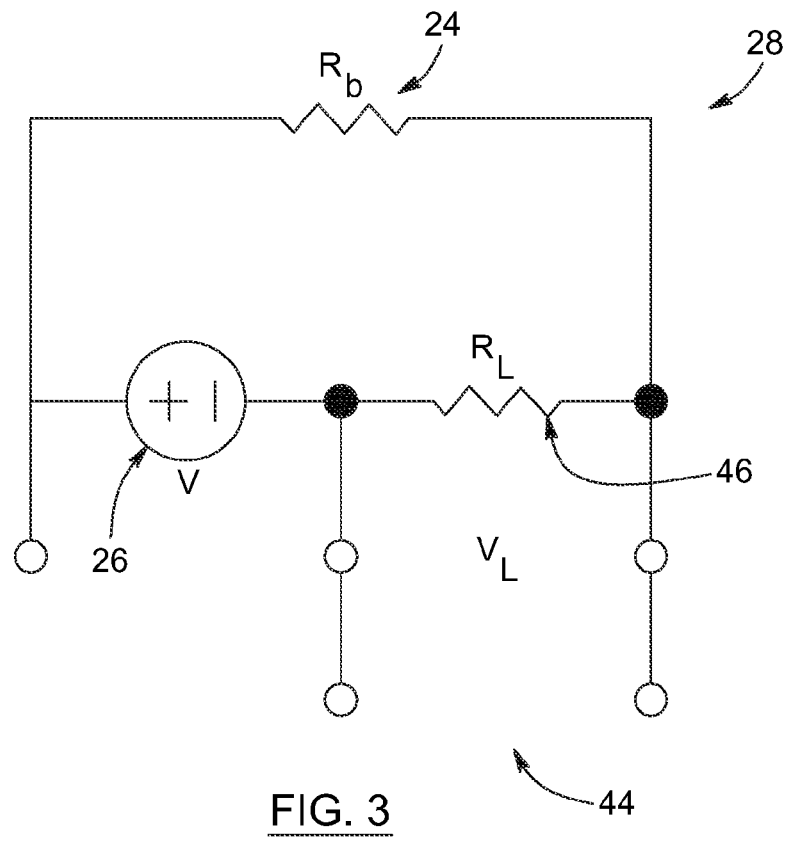
FIG. 3 shows the gauge electrical readout circuit and the electrical power source of a gauge microbolometer of a thermal imaging radiometer, according to one embodiment of the invention.
Figure 4:
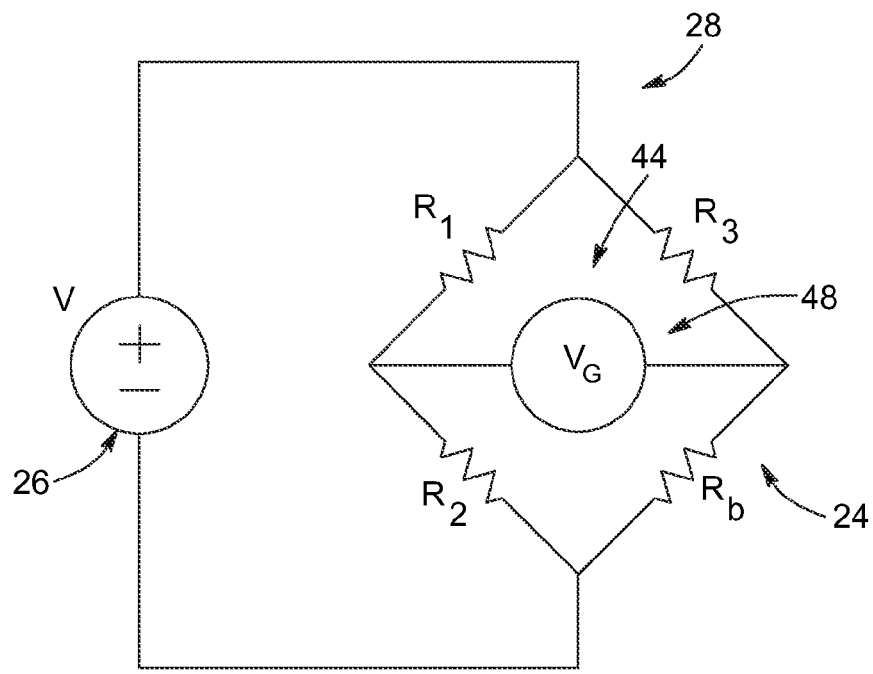
FIG. 4 shows the gauge electrical readout circuit and the electrical power source of a gauge microbolometer of a thermal imaging radiometer, according to another embodiment of the invention.

It will be understood by those skilled in the art that, in reference to steps 102 and 104 of the detection method 100 discussed above and depicted in FIG. 5A, the role of the electrical power source 26 shown in FIGS. 3 and 4 consists respectively in applying a first and a second electrical stimulation to the gauge microbolometer 24 to bring it to a first and a second predetermined temperature $T_{b1}$ and $T_{b2}$, respectively. As mentioned above, by virtue of the TCR of the gauge microbolometer 24, the first and second predetermined temperatures $T_{b1}$ and $T_{b2}$ correspond to a first and a second electrical resistance $R_{b1}$ and $R_{b2}$ thereof.

It will also be understood that, in reference to step 106 of the detection method 100 discussed above, the role of the gauge electrical readout circuits 28 consists in determining a measured ohmic responsivity $\Omega_b$ of the gauge microbolometer 24 that is representative of a difference between the first and second electrical stimulations.

FIGS. 3 and 4 provide circuit representations of how the voltage source 26 and the gauge electrical readout circuit 28 are connected to the gauge microbolometer 24 according to embodiments of the invention, wherein the gauge microbolometer 24 acts as a temperature-dependent variable resistance $R_b$.

In these two embodiments, the voltage source 26 is preferably embodied by a binary-wave voltage source 26, which applies a periodic time-varying binary-valued voltage V having a minimum voltage $V_1$ and a maximum voltage $V_2$ corresponding to the first and second electrical stimulations, respectively, as well as an amplitude $\Delta V = V_2 - V_1$. As mentioned above, the temporal frequency of the driving voltage V is sufficiently low to achieve a steady-state thermal regime during each half period thereof.

The gauge electrical readout circuit 28 further includes an electrical measurement module 44 configured to monitor, either directly or indirectly, an electrical resistance of the gauge electrical readout circuit 28. For example, the electrical measurement module 44 may include a voltmeter, an ammeter, a wattmeter or any other appropriate electrical measuring devices.

As is well known in the art, since the voltage $V_b$ across the resistance $R_b$ of the gauge microbolometer 24 is related to the driving voltage V applied by the voltage source 26 and a transfer function $f_b$ of the gauge electrical readout circuit 28, the voltage $V_b$ may be measured by probing the voltage at some other resistive load element of the gauge electrical readout circuit 28. The gauge electrical readout circuit 28 thus includes at least one load resistance 46 configured to monitor the electrical resistance $R_b$ of the sensor element 40 of the gauge microbolometer 24. The load resistance 46 may be the gauge microbolometer 24 itself or any other appropriate resistive element of the gauge electrical readout circuit 28.

Referring specifically to FIG. 3, the embodiment of the invention depicted therein includes a binary-wave voltage source 26 configured to apply a driving voltage V, which is adjustable in both value and amplitude ($V_1$, $V_2$, $\Delta V$). The binary-wave voltage source 26 drives a gauge microbolometer 24 whose resistance $R_b$ is completely determined by its temperature $T_b$, and a load resistance 46 whose value $R_L$ is fixed and known. Hence, as one skilled in the art would readily understand knowledge of the voltage $V_L$ across the load resistance 46 could be used to determine the resistance $R_b$ of the gauge microbolometer 24.

The gauge electrical readout circuit 28 may be made of analog or digital electronic components or a combination of analog and digital electronic components. As mentioned above, the role of the gauge electrical readout circuits 28 is to determine a measured ohmic responsivity $\Omega_b$ of the gauge microbolometer 24 that is representative of a difference between the first and second electrical stimulations $V_1$ and $V_2$.

The voltage $V_b$ across the gauge microbolometer 24 and the voltage $V_L$ across the load resistance 46 are related to the driving voltage V applied by the electrical power source 26 via the transfer functions $f_b$ and $f_L$ as follows:

$$V_b = f_b V = \left(\frac{R_b}{R_L + R_b}\right) V, \quad (3)$$

$$V_L = f_L V = \left(\frac{R_L}{R_L + R_b}\right) V. \quad (4)$$

Hence, with reference to Equation (2), the measured ohmic responsivity $\Omega_b$ of the gauge microbolometer 24 may be expressed as:

$$\Omega_b = \frac{dR_b}{dP_b} = \frac{R_{b2} - R_{b1}}{\frac{V_{b2}^2}{R_{b2}} - \frac{V_{b1}^2}{R_{b1}}} = \frac{R_{b2} - R_{b1}}{\frac{f_{b2}^2 V_2^2}{R_{b2}} - \frac{f_{b1}^2 V_1^2}{R_{b1}}}, \quad (5)$$

where $f_{b1} = R_{b1}/(R_L + R_{b1})$ and $f_{b2} = R_{b2}/(R_L + R_{b2})$, so that the measured ohmic responsivity $\Omega_b$ is indeed representative of a difference $V_2 - V_1$ between the first and second electrical stimulations $V_1$ and $V_2$. Moreover, since $R_L$ is known and $R_{b1}$ and $R_{b2}$ are completely determined by the first and second predetermined temperatures $T_{b1}$ and $T_{b2}$, the only unknown quantities in Equation (5) are $V_1$ and $V_2$. The determination of the measured ohmic responsivity $\Omega_b$ thus reduces to the determination of the values $V_1$ and $V_2$ applied by the binary-wave voltage source 26 at which the predetermined conditions $R_b = R_{b1}$ and $R_b = R_{b2}$ are fulfilled, respectively.

This may be accomplished based on the recognition that the conditions $R_b = R_{b1}$ and $R_b = R_{b2}$ correspond to specific values of the transfer function $f_L = V_L/V$ defined in Equation (4), namely that $f_{L1} = R_L/(R_L + R_{b1})$ when $R_b = R_{b1}$ and that $f_{L2} = R_L/(R_L + R_{b2})$ when $R_b = R_{b2}$. As one skilled in the art will readily understand, the value of the transfer function $f_L = V_L/V$ can be monitored by performing steps 114 and 116 of the detection method 100 described above and illustrated in the flow chart of FIG. 5A.

More specifically, this may be performed by monitoring the value of the voltage $V_L = f_L V$ across the load resistance 46 with a voltmeter included in the electrical measurement module 44, while simultaneously adjusting the value of the driving voltage V generated by the binary-wave voltage 26. It will then be readily understood that the condition $R_b = R_{b1}$ is fulfilled when the driving voltage V is set to a value $V_1$ at which the voltage $V_L$ measured by the voltmeter of the electrical measurement module 44 becomes equal to $V_{L1} = f_{L1} V_1$. Similarly, it will also be readily understood that the condition $R_b = R_{b2}$ is fulfilled when the driving voltage V is adjusted to a value $V_2$ at which the voltage $V_L$ measured by the voltmeter of the electrical measurement module 44 becomes equal to $V_{L2} = f_{L2} V_2$. Finally, the values of $V_1$ and $V_2$ thus determined can be reported in Equation (5), along with the known values of $R_{b1}$, $R_{b2}$, $f_{b1}$ and $f_{b2}$, in order to determine the measured ohmic responsivity $\Omega_b$ of the gauge microbolometer 24.

Referring now to FIG. 4, the alternative embodiment of the invention shown therein also includes a binary-wave voltage source 26 configured to apply a driving voltage V, which is adjustable in both value and amplitude ($V_1$, $V_2$, $\Delta V$). The binary-wave voltage source 26 drives a gauge microbolometer 24 whose resistance $R_b$ is completely determined by its temperature $T_b$, and a bridge resistor 48 including resistors whose values are known and equal to $R_1$, $R_2$ and $R_3$. It will be understood by those skilled in the art that knowledge of the voltage $V_G$ across the resistor bridge 48 may be used to determine the resistance $R_b$ of the gauge microbolometer 24.

As for the embodiment of FIG. 3, the gauge electrical readout circuit 28 may be made of analog or digital electronic components or a combination of analog and digital electronic components. As mentioned above, the role of the gauge electrical readout circuits 28 is to determine a measured ohmic responsivity $\Omega_b$ of the gauge microbolometer 24 that is representative of a difference between the first and second electrical stimulations $V_1$ and $V_2$.

The voltage $V_b$ across the gauge microbolometer 24 and the voltage $V_G$ across the resistor bridge 48 are related to the driving voltage V applied by the electrical power source 26 via the following transfer functions $f_b$ and $f_G$:

$$V_b = f_b V = \left(\frac{R_b}{R_3 + R_b}\right) V, \quad (6)$$

$$V_G = f_G V = \left(\frac{R_b}{R_3 + R_b} - \frac{R_2}{R_1 + R_2}\right) V. \quad (7)$$

With reference to Equation (2), the measured ohmic responsivity $\Omega_b$ of the gauge microbolometer 24 can be expressed as in Equation (5) given above, where $f_{b1}$ and $f_{b2}$ are now given by Equation (6), that is, $f_{b1}=R_{b1}/(R_3+R_{b1})$ and $f_{b2}=R_{b2}/(R_3+R_{b2})$, respectively. Again, the determination of the measured ohmic responsivity $\Omega_b$ thus comes down to the determination of the values $V_1$ and $V_2$ applied by the binary-wave voltage source 26 in order for the predetermined conditions $R_b=R_{b1}$ and $R_b=R_{b2}$ to be fulfilled, respectively.

Similarly to the embodiment of FIG. 3, the appropriate values of $V_1$ and $V_2$ may be determined by recognizing that the predetermined conditions $R_b=R_{b1}$ and $R_b=R_{b2}$ are associated with specific values of the transfer function $f_G=V_G/V$ defined in Equation (7), namely that $f_{G1}=[R_{b1}/(R_3+R_{b1})-R_2/(R_1+R_2)]$ when $R_b=R_{b1}$ and that $f_{G2}=[R_{b2}/(R_3+R_{b2})-R_2/(R_1+R_2)]$ when $R_b=R_{b2}$. As will be understood by those skilled in the art, the value of the transfer function $f_G=V_G/V$ can be monitored by performing steps 114 and 116 of the detection method 100 depicted in FIG. 5A.

In particular, and as for the embodiment of FIG. 3, this may be accomplished by monitoring the value of the voltage $V_G=f_G V$ across the bridge resistor 48 with a voltmeter included in the electrical measurement module 44, while simultaneously adjusting the value of the driving voltage V generated by the binary-wave voltage 26. By doing so, the condition $R_b=R_{b1}$ is fulfilled when the driving voltage V is adjusted to a value $V_1$ at which the voltage $V_G$ measured by the voltmeter of the electrical measurement module 44 becomes equal to $V_{G1}=f_{G1}V_1$. Similarly, the condition $R_b=R_{b2}$ is fulfilled when the driving voltage V is adjusted to a value $V_2$ at which the voltage $V_G$ measured by the voltmeter of the electrical measurement module 44 becomes equal to $V_{G2}=f_{G2}V_2$. From the values of $V_1$ and $V_2$ thus determined and the known values of $R_{b1}$, $R_{b2}$, $f_{b1}$ and $f_{b2}$, Equation (5) may be used to determine the measured ohmic responsivity $\Omega_b$ of the gauge microbolometer 24.

Method for Correcting a Loss of Calibration of a Thermal Imaging Radiometer

According to a further aspect of the invention, there is provided a method 200 for correcting a loss of calibration of a thermal imaging radiometer including an array of imaging microbolometers and a gauge microbolometer for detecting the loss of calibration. FIG. 6A shows a flow chart of an embodiment of the method 200, which can be performed with a thermal imaging radiometer 20 such as that illustrated in FIGS. 2A and 2B.

The correction method 200 is generally based on the recognition that if a loss of calibration of a thermal imaging radiometer is detected, then knowledge of the extent of that loss of calibration may be used as a parameter to correct the response of the thermal imaging radiometer. It will however be readily understood that the method for detecting a loss of calibration described above can be used without the present or other methods for correcting the detected loss without departing from the scope of the present invention.

As will be understood from the following description, the correction method 200 illustrated in FIG. 6A and the detection method 100 illustrated in FIG. 5A share common steps, in particular steps 102, 104 and 106 of the detection method 100. Hence, as will also be understood, the description of these steps and of any features or variants thereof that were detailed above in relation to the detection method 100 will not be described in further detail hereinbelow.

The correction method 200 first includes a step 202 of providing, for each imaging microbolometer, an initial voltage response function. This initial voltage response function provides an output voltage of the associated imaging microbolometer as a function of a scene temperature and includes a first and a second term. The first term is equal to an output voltage of the imaging microbolometer associated therewith corresponding to an initial reference scene temperature, while the second term is a function of a difference between the scene temperature and the initial reference scene temperature. In the context of the present description, the expression "scene temperature" refers, for a given imaging microbolometer, to the temperature of the region of a target scene that imaged by that particular imaging microbolometer. It will also be understood that the range of scene temperatures that can be handled by the thermal imaging radiometer depends on the specific characteristics and intended use thereof. For example, in some embodiments of the invention, the range of scene temperatures may encompass temperatures of between 30 and 1000 degrees Celsius.

As known in the art and as discussed above, imaging microbolometers need to be calibrated prior to use. The calibration may be performed, for example, by subjecting the imaging microbolometers to the radiation emitted from a series of precisely thermoregulated blackbody calibration sources at specific temperatures and recording the response of the imaging microbolometers thereto. This initial calibration of a microbolometer thermal imaging radiometer is typically performed in a controlled environment by the manufacturer, the supplier, or a commercial calibration laboratory.

As a result, each imaging microbolometer of the array that is put into service is usually provided with an initial voltage response function. This initial voltage response function relates an output voltage of the imaging microbolometer to a scene temperature. It may be established during the manufacturing of the radiometer, prior to a first use thereof, or as part of a recalibration procedure. It will be understood by those skilled in the art that the initial voltage response function of each imaging microbolometer is preferably stored in a memory element, for example a serial flash memory, so that it can be easily retrieved while performing the correction method 200.

When the thermal imaging radiometer absorbs thermal radiation from a target scene, the initial voltage response function of each imaging microbolometer allows for the conversion of the electrical output generated by the imaging microbolometer associated therewith into temperature data.

As is known by one skilled in the art, this temperature data may then be used to generate a thermal image of the target scene.

For example, in the practical case of an M×N two-dimensional array of imaging microbolometers, the initial voltage response function of the imaging microbolometer located at line i and column j of the array may be expressed as:

$$V_{out,ij} = V_{out0,ij}(T_{scene0}) + f_{ij}(T_{scene} - T_{scene0}). \tag{8}$$

The first term on the right-hand side of Equation (8) is the output voltage $V_{out0,ij}$ of the imaging microbolometer located at position (i, j) of the array in response to an initial reference scene temperature $T_{scene0}$. It will be understood that the initial reference scene temperature $T_{scene0}$ should preferably be selected so as to lie in the range of scene temperatures $T_{scene}$ that can be handled by the thermal imaging radiometer. Moreover, the second term $f_{ij}(T_{scene} - T_{scene0})$ is a function of a difference between the scene temperature $T_{scene}$ and the initial reference scene temperature $T_{scene0}$. In other words, $f_{ij}(T_{scene} - T_{scene0})$ depends on the deviation of the scene temperature $T_{scene}$ from the initial reference scene temperature $T_{scene0}$.

Similarly, when the array is an M×1 linear array, the initial voltage response function of the imaging microbolometer located at line i may be expressed as:

$$V_{out,i} = V_{out0,i}(T_{scene0}) + f_i(T_{scene} - T_{scene0}), \tag{9}$$

where, similarly to Equation (8), $V_{out0,i}$ is the output voltage of the imaging microbolometer located at line i of the linear array in response to an initial reference scene temperature $T_{scene0}$, while $f_i(T_{scene} - T_{scene0})$ is a function of a difference between the scene temperature $T_{scene}$ and the initial reference scene temperature $T_{scene0}$.

Still referring to FIG. 6A, the correction method 200 also includes a step 204 of applying a first electrical stimulation to the gauge microbolometer which brings the gauge microbolometer to a first predetermined temperature $T_{b1}$ in a steady-state thermal regime.

The method next involves a step 206 of applying a second electrical stimulation to the gauge microbolometer which brings the gauge microbolometer to a second predetermined temperature $T_{b2}$ in a steady-state thermal regime.

As discussed above in the context of the detection method 100, the correction method 200 according to embodiments of the invention involves that the steps 204 and 206 of applying the first and second electrical stimulations to the gauge microbolometer be performed under substantially identical radiation exposure conditions.

The correction method 200 further includes a step 208 of determining a measured ohmic responsivity $\Omega_b$ of the gauge microbolometer, the measured ohmic responsivity $\Omega_b$ being representative of a difference between the first and second electrical stimulations.

It will be understood by those skilled in the art that steps 204, 206 and 208 of the correction method 200 are respectively the same as steps 102, 104 and 106 of the detection method 100 described above, and may therefore be embodied in similar manners.

Finally, the embodiment of the correction method 200 shown in FIG. 6A involves a step 210 of computing a corrected voltage response function for each imaging microbolometer by correcting the corresponding initial voltage response function thereof. The computing 210 of each corrected voltage response function may be further divided into three substeps 212, 214 and 216.

Firstly, step 210 requires obtaining 212 a corrected value for the first term of the corresponding initial voltage response function by measuring the output voltage of each imaging microbolometer in response to irradiation by a blackbody at an updated reference scene temperature $T_{scene0}^*$.

Secondly, step 210 requires obtaining 214 a corrected value for the second term of the corresponding initial voltage response function. This is accomplished by re-expressing the second term as a function of a difference between the scene temperature $T_{scene}$ and the updated reference scene temperature $T_{scene0}^*$, and by multiplying the second term by a correction factor $\alpha$ defined as a ratio between a reference ohmic responsivity $\Omega_{b0}$ of each gauge microbolometer and the measured ohmic responsivity $\Omega_b$ measured in step 208, that is, $\alpha = \Omega_{b0}/\Omega_b$.

Thirdly, step 210 requires updating 216 both first and second terms of the initial voltage response function with both corrected values for the first and second terms to obtain a corrected voltage response function for each imaging microbolometer.

Preferably, step 210 further includes storing 222 the corrected voltage response function of each imaging microbolometer in a memory element, for example a serial flash memory. Further preferably, an end result of step 210, that is, whether or not the corrected and initial voltage response functions differ from each other and, if so, by what amount, may be communicated to a user by a visual indicator, an audio indicator, or a combination thereof. The end result may be also displayed on a viewing device, for example on a PC, on the screen of a handheld monitor, or on any other appropriate viewing device.

As discussed above, the reference ohmic responsivity $\Omega_{b0}$ should be determined for the same first and second predetermined temperatures $T_{b1}$ and $T_{b2}$ as the measured ohmic responsivity $\Omega_b$ so that $\Omega_{b0}$ provides a suitable reference value against which $\Omega_b$ can be compared in order to obtain the correction factor $\alpha = \Omega_{b0}/\Omega_b$ and thus to correct a loss of calibration of the thermal imaging radiometer. As also mentioned above, the reference ohmic responsivity $\Omega_{b0}$ may be determined as part of the initial calibration setup of the thermal imaging radiometer or following a recalibration procedure of the thermal imaging radiometer. Preferably, the reference ohmic responsivity $\Omega_{b0}$ is stored in a memory element so that it is readily available in step 214 for determining the correction factor $\alpha$.

Referring back to the above example of an M×N two-dimensional array of imaging microbolometers, the corrected voltage response function of the imaging microbolometer located at line i and column j of the array would then be expressed as:

$$V_{out,ij}^* = V_{out0,ij}^*(T_{scene0}^*) + \alpha \cdot f_{ij}(T_{scene} - T_{scene0}^*). \tag{10}$$

On the one hand, the first term on the right-hand side of Equation (10) is the output voltage $V_{out0,ij}$ of the imaging microbolometer located at position (i, j) of the array and corresponds to the output voltage of the imaging microbolometer in response to irradiation by a blackbody at the updated reference scene temperature $T_{scene0}^*$. It will be understood that the updated reference scene temperature $T_{scene0}^*$ is preferably selected so as to lie in the range of scene temperatures $T_{scene}$ that can be supported by the thermal imaging radiometer. On the other hand, the second term $f_{ij}(T_{scene} - T_{scene0}^*)$ is a function of a difference between the scene temperature $T_{scene}$ and the updated reference scene temperature $T_{scene0}^*$. It will be also understood by that $f_{ij}(T_{scene} - T_{scene0}^*)$ corresponds to the same mathematical function as $f_{ij}(T_{scene} - T_{scene0})$, but shifted by the amount $(T_{scene0}^* - T_{scene0})$ along the $T_{scene}$ axis.

Similarly to Equation (10), the corrected voltage response function of the imaging microbolometer located at line i of an M×1 linear array would become:

$$V_{out,i}^* = V_{out0,i}^*(T_{scene0}^*) + \alpha \cdot f_j(T_{scene} - T_{scene0}^*). \quad (11)$$

As one skilled in the art will readily understand, the amount by which the correction factor $\alpha$ differs from unity, this latter case representing the particular case where no loss of calibration is detected, reflects the amount by which the ohmic responsivity $\Omega_b$ of the gauge microbolometer has drifted from $\Omega_{b0}$ and, thus, the extent of the correction that needs to be applied to the initial voltage response function of each imaging microbolometer.

Moreover, because the correction factor $\alpha$ is computed from the response of the gauge microbolometer and is then used to correct the second term of the initial voltage response function of all the imaging microbolometers, one skilled in the art will also recognize that step 214 of the correction method 200 is mainly directed at correcting uniform calibration drifts, as defined in regard to the detection method 100 described above.

It is also to be noted that in step 212 of the correction method 200, the first term of the initial voltage response function of each imaging microbolometer is corrected independently of the others. Hence, the correction method 200 also makes it possible to correct, to a certain extent, some of the individual calibration drifts experienced by each imaging microbolometer. Indeed, even if no loss of calibration is observed (i.e. $\alpha=1$), the correction method 200 provides a way to update the initial voltage response function of each imaging microbolometer of the array by measuring, with reference to Equation (10), the output voltage $V_{out0,ij}^*(T_{scene0}^*)$ of each imaging microbolometer at a known updated reference scene temperature $T_{scene0}^*$.

Advantageously, one skilled in the art will further understand and appreciate that the correction method 200 requires only a single blackbody at a known temperature, that is, the updated reference scene temperature $T_{scene0}^*$. Further advantageously, this blackbody may simply be embodied by a high emissivity surface at a known temperature $T_{scene0}^*$, as opposed to the need for a series of thermoregulated blackbody calibration sources, thereby reducing the complexity and weight of the calibration setup and the duration of the calibration procedure. For example, a suitable blackbody may be simulated by closing an external shutter of the thermal imaging radiometer. The shutter would play the role of the blackbody (i.e. that of a high emissivity surface) and its temperature could then be monitored by equipping the shutter with a temperature measuring device, for example a thermistor, a resistive temperature detector, a thermocouple, or a diode.

The correction method 200 according to embodiments of the invention could thus prove particularly advantageous in the context of thermal imaging radiometers used in space missions and requiring an on-board calibration setup that should be as light and simple as possible.

Figure 6B:
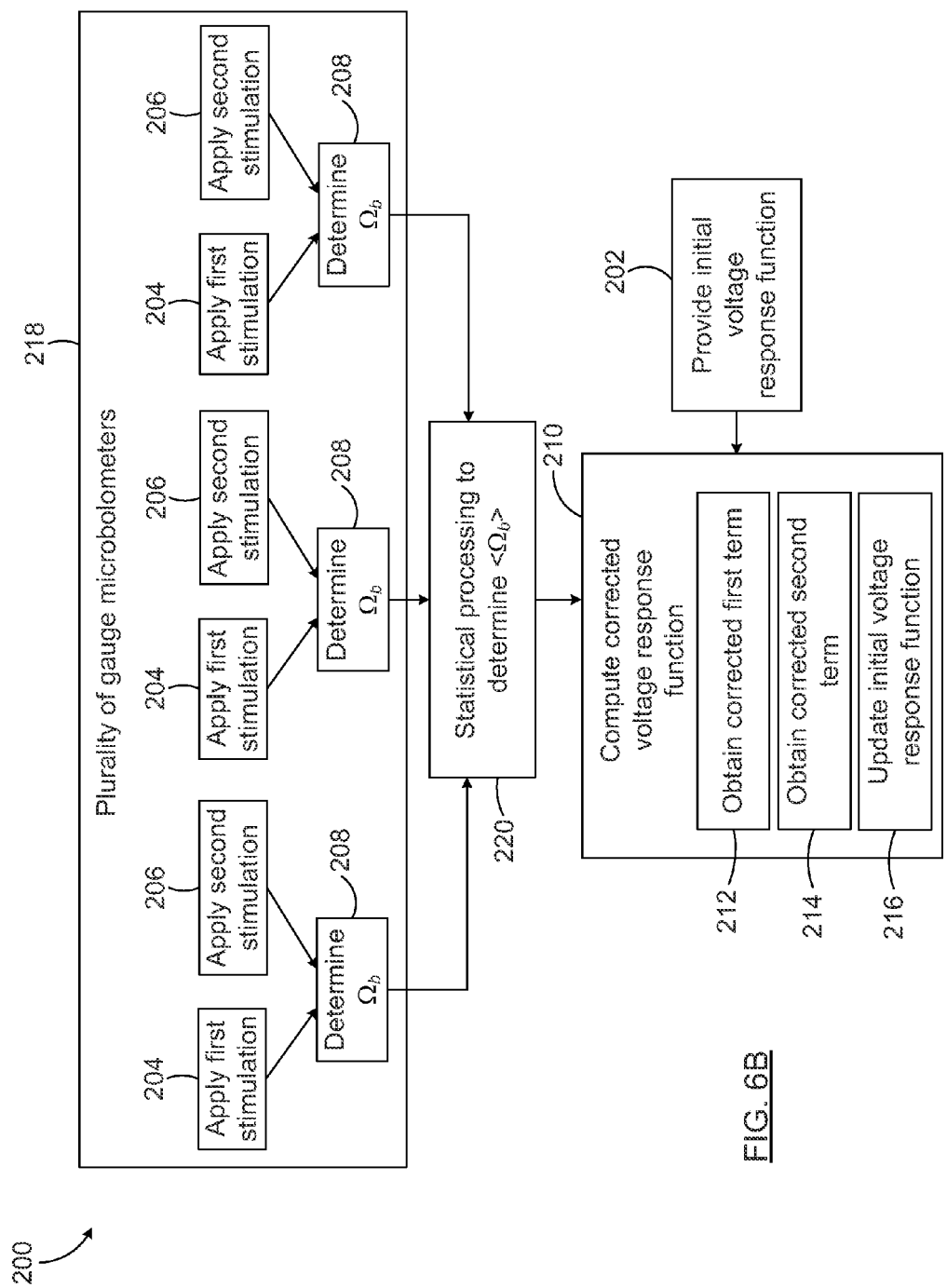

Referring now to the flow chart of FIG. 6B, there is shown another embodiment of the method 200 for correcting a loss of calibration of a thermal imaging radiometer. The embodiment of FIG. 6B shares several common steps with the embodiment shown in FIG. 6A, but it differs in some aspects. The main difference is that the embodiment of the correction method 200 illustrated in FIG. 6B preferably involves a step 218 of performing steps 204, 206 and 208 as described above for a plurality of gauge microbolometers, preferably but not necessarily identical to each other, thereby obtaining a plurality of values of measured ohmic responsivity $\Omega_b$. It will be understood herein that step 218 of the correction method 200 is equivalent to step 124 illustrated in the flow chart of the embodiment of the detection method 100 of FIG. 5B.

The embodiment of FIG. 6B also preferably includes performing a statistical processing 220 of the plurality of values of measured responsivity $\Omega_b$ in order to yield an average measured ohmic responsivity $\langle \Omega_b \rangle$. As for other steps of the correction method 200, it will be understood that step 220 is equivalent to step 126 illustrated in the flow chart of the embodiment of the detection method 100 of FIG. 5B, and as such, will not be described in further detail.

This average measured ohmic responsivity $\langle \Omega_b \rangle$ may then be used with a reference ohmic responsivity $\Omega_{b0}$ of the gauge microbolometer in step 214 in order to obtain a correction factor $\alpha = \Omega_{b0}/\langle \Omega_b \rangle$, which may then be used to get a corrected value for the second term of the initial voltage response function. Preferably, the reference ohmic responsivity $\Omega_{b0}$ may also represent an average reference ohmic responsivity $\langle \Omega_{b0} \rangle$, that is, an appropriate statistical average of the reference ohmic responsivity $\Omega_{b0}$ of the plurality of gauge microbolometers. In this case, the correction factor becomes $\alpha = \langle \Omega_{b0} \rangle / \langle \Omega_b \rangle$.

As mentioned above, providing a plurality of gauge microbolometers improves the precision and reliability of the correction method 200 embodied in FIG. 6B when compared to the embodiment of FIG. 6A, wherein the measured ohmic responsivity $\Omega_b$ is determined from a single gauge microbolometer. Indeed, in the embodiment of FIG. 6B, the response of one or a few faulty gauge microbolometers will tend to get averaged out or discarded compared to the responses of all the other functional gauge microbolometers.

Of course, numerous modifications could be made to the embodiments described above without departing from the scope of the present invention.

The invention claimed is:

1. A method for detecting a loss of calibration of a thermal imaging radiometer comprising an array of imaging microbolometers and a gauge microbolometer for detecting said loss of calibration, the method comprising the steps of:
   a) applying a first electrical stimulation to the gauge microbolometer which brings said gauge microbolometer to a first predetermined temperature in a steady-state thermal regime;
   b) applying a second electrical stimulation to the gauge microbolometer which brings said gauge microbolometer to a second predetermined temperature in a steady-state thermal regime, the first predetermined temperature and the second predetermined temperature being different, steps a) and b) being performed under substantially identical radiation exposure conditions;
   c) determining a measured ohmic responsivity of the gauge microbolometer, said measured ohmic responsivity being representative of a difference between said first and second electrical stimulations; and
   d) comparing the measured ohmic responsivity with a reference ohmic responsivity of the gauge microbolometer, and signaling a loss of calibration of the thermal imaging radiometer when said measured ohmic responsivity and said reference ohmic responsivity differ by more than a predetermined threshold.

2. The method according to claim 1, wherein steps a) and b) comprise applying the first and second electrical stimulations to a sensor element of the gauge microbolometer, said sensor element having a temperature-dependent electrical resistance, the first and second predetermined temperatures corresponding to a first and a second electrical resistance of said sensor element, respectively.

3. The method according to claim 2, wherein steps a) and b) further comprise the substeps of:
provliding a gauge electrical readout circuit connected to the gauge microbolometer;
monitoring the electrical resistance of the sensor element of the gauge microbolometer using said gauge electrical readout circuit; and
during said monitoring, adjusting the first and second electrical stimulations until the first and second electrical resistances are reached, respectively.

4. The method according to claim 1, wherein steps a) and b) comprise applying a first and a second applied voltage with a voltage source, respectively.

5. The method according to claim 1, wherein steps a) and b) comprise applying a first and a second applied current with a current source, respectively.

6. The method according to claim 1, wherein steps a) and b) together comprise applying a binary-valued electrical stimulation having a first and a second value corresponding to the first and second electrical stimulations, respectively.

7. The method according to claim 6, wherein said binary-valued electrical stimulation is a periodic time-varying binary-valued electrical stimulation having a temporal frequency which is low enough to achieve a steady-state thermal regime during each half period thereof.

8. The method according to claim 1, wherein signaling a loss of calibration of the thermal imaging radiometer comprises providing a pass or fail verdict.

9. The method according to claim 1, wherein signaling a loss of calibration of the thermal imaging radiometer is performed by a processing unit.

10. The method according to claim 1, wherein signaling a loss of calibration is communicated to a user by one of a visual indicator, an audio indicator and a combination thereof.

11. The method according to claim 1, further comprising:
performing steps a) to c) for a plurality of gauge microbolometers of the thermal imaging radiometer, thereby obtaining a corresponding plurality of values of measured ohmic responsivity; and
performing, prior to step d), a statistical processing of said plurality of values of measured ohmic responsivity in order to yield an average measured ohmic responsivity to be used in step d).

12. A thermal imaging radiometer comprising:
an array of imaging microbolometers;
a gauge microbolometer for detecting a loss of calibration of the thermal imaging radiometer;
an electrical power source connected to said gauge microbolometer and configured to apply, under substantially identical radiation exposure conditions, a first electrical stimulation to the gauge microbolometer which brings said gauge microbolometer to a first predetermined temperature in a steady-state thermal regime, and a second electrical stimulation to the gauge microbolometer which brings said gauge microbolometer to a second predetermined temperature in a steady-state thermal regime, the first predetermined temperature and the second predetermined temperatures being different;
a gauge electrical readout circuit connected to said gauge microbolometer and configured to determine a measured ohmic responsivity thereof, said measured ohmic responsivity being representative of a difference between said first and second electrical stimulations;
a processing unit connected to said gauge electrical readout circuit and configured to compare the measured ohmic responsivity with a reference ohmic responsivity of the gauge microbolometer, and to signal a loss of calibration of the thermal imaging radiometer when said measured ohmic responsivity and said reference ohmic responsivity differ by more than a predetermined threshold.

13. The thermal imaging radiometer according to claim 12, wherein the imaging microbolometers and the gauge microbolometer are substantially identical.

14. The thermal imaging radiometer according to claim 12, wherein the gauge microbolometer is located on a periphery of the array of imaging microbolometers.

15. The thermal imaging radiometer according to claim 12, wherein the gauge microbolometer comprises a sensor element having a temperature-dependent electrical resistance, the first and second predetermined temperatures corresponding to a first and a second electrical resistance of said sensor element, respectively.

16. The thermal imaging radiometer according to claim 15, wherein the sensor element of the gauge microbolometer is made of one of a vanadium oxide material, a titanium oxide material and an amorphous silicon material.

17. The thermal imaging radiometer according to claim 15, wherein the gauge electrical readout circuit is further configured to monitor the electrical resistance of the sensor element of the gauge microbolometer, and wherein the electrical power source is configured to adjust the first and second electrical stimulations until the first and second electrical resistances are reached, respectively.

18. The thermal imaging radiometer according to claim 15, wherein the gauge electrical readout circuit comprises at least one load resistance configured to monitor the electrical resistance of the sensor element of the gauge microbolometer.

19. The thermal imaging radiometer according to claim 12, wherein the gauge electrical readout circuit is a CMOS device.

20. The thermal imaging radiometer according to claim 12, further comprising a hermetically sealed vacuum package enclosing the array of imaging microbolometers and the gauge microbolometer thereinside, thereby exposing said array of imaging microbolometers and said gauge microbolometer to a same atmospheric environment.

21. The thermal imaging radiometer according to claim 12, wherein the electrical power source is one of a voltage source and a current source.

22. The thermal imaging radiometer according to claim 12, wherein the electrical power source is a binary-wave electrical power source.

23. The thermal imaging radiometer according to claim 12, wherein the processing unit comprises a memory element adapted for storing the reference ohmic responsivity of the gauge microbolometer.

24. The thermal imaging radiometer according to claim 12, further comprising a plurality of gauge microbolometers.

25. The thermal imaging radiometer according to claim 24, wherein the plurality of gauge microbolometers is disposed on a periphery of the array of imaging microbolometers.

26. The thermal imaging radiometer according to claim 24, wherein each of said gauge microbolometers is connected to a respective gauge electrical readout circuit configured to determine a respective measured ohmic responsivity, thereby providing a plurality of values of measured ohmic responsivity for the plurality of gauge microbolometers, and wherein the processing unit is further configured to compute a statistical average of said plurality of values of measured ohmic responsivity, thereby yielding an average measured ohmic responsivity to be compared with said reference ohmic responsivity.

27. A method for correcting a loss of calibration of a thermal imaging radiometer comprising an array of imaging microbolometers and a gauge microbolometer for detecting said loss of calibration, the method comprising the steps of:
   a) providing, for each imaging microbolometer, an initial voltage response function providing an output voltage of the associated imaging microbolometer as a function of a scene temperature, the initial voltage response function comprising a first and a second term, wherein the first term is equal to the output voltage corresponding to an initial reference scene temperature, and wherein the second term is a function of a difference between the scene temperature and the initial reference scene temperature;
   b) applying a first electrical stimulation to the gauge microbolometer which brings said gauge microbolometer to a first predetermined temperature in a steady-state thermal regime;
   c) applying a second electrical stimulation to the gauge microbolometer which brings said gauge microbolometer to a second predetermined temperature in a steady-state thermal regime, steps b) and c) being performed under substantially identical radiation exposure conditions;
   d) determining a measured ohmic responsivity of the gauge microbolometer, said measured ohmic responsivity being representative of a difference between said first and second electrical stimulations; and
   e) computing a corrected voltage response function for each imaging microbolometer, the computing comprising:
      i) obtaining a corrected value for the first term of the corresponding initial voltage response function by measuring the output voltage of the imaging microbolometer in response to irradiation by a blackbody at an updated reference scene temperature;
      ii) obtaining a corrected value for the second term of the corresponding initial voltage response function by re-expressing said second term as a function of a difference between said scene temperature and said updated reference scene temperature and by multiplying said second term by a correction factor, said correction factor being defined as a ratio between a reference ohmic responsivity of the gauge microbolometer and the measured ohmic responsivity; and
      iii) updating both the first and the second terms of the initial voltage response function with both corrected values for the first and second terms to obtain a corrected voltage response function for each imaging microbolometer.

28. The method according to claim 27, wherein steps b) and c) comprise applying the first and a second electrical stimulation to a sensor element of the gauge microbolometer, said sensor element having a temperature-dependent electrical resistance, the first and second predetermined temperatures corresponding to a first and a second electrical resistance of said sensor element, respectively.

29. The method according to claim 28, wherein steps b) and c) further comprise the substeps of:
   providing a gauge electrical readout circuit connected to the gauge microbolometer,
   monitoring the electrical resistance of the sensor element of the gauge microbolometer using said gauge electrical readout circuit; and
   during said monitoring, adjusting the first and second electrical stimulations until the first and second electrical resistances are reached, respectively.

30. The method according to claim 27, wherein steps b) and c) comprise applying a first and a second applied voltage with a voltage source, respectively.

31. The method according to claim 27, wherein steps b) and c) comprise applying a first and a second applied current with a current source, respectively.

32. The method according to claim 27, wherein steps b) and c) together comprise applying a binary-valued electrical stimulation having a first and a second value corresponding to the first and second electrical stimulations, respectively.

33. The method according to claim 32, wherein said binary-valued electrical stimulation is a periodic time-varying binary-valued electrical stimulation having a temporal frequency which is low enough to achieve a steady-state thermal regime during each half period thereof.

34. The method according to claim 27, wherein step e) further comprises storing the corrected voltage response function of each imaging microbolometer in a memory element.

35. The method according to claim 27, wherein an end result of step e) is communicated to a user by one of a visual indicator, an audio indicator and a combination thereof.

36. The method according to claim 27, further comprising:
   performing steps b) to d) for a plurality of gauge microbolometers, thereby obtaining a corresponding plurality of values of measured ohmic responsivity; and
   performing, prior to step e), a statistical processing of said plurality of values of measured ohmic responsivity in order to yield an average measured ohmic responsivity to be used to compute the correction factor in step e).

37. The method according to claim 27, wherein step e) is performed by a processing unit.

* * * * *